(12) United States Patent
McNeil et al.

(10) Patent No.: US 9,873,046 B2
(45) Date of Patent: Jan. 23, 2018

(54) ASYNCHRONOUS ONLINE GAME PLAY AND DEFEND MODE PROCESSING TO ENABLE SOCIAL FRIENDS TO ASSIST AND ALTER GAME PLAY OUTCOMES

(71) Applicant: Zynga Inc., San Francisco, CA (US)

(72) Inventors: Cameron McNeil, San Francisco, CA (US); Jordan Maynard, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 15/683,767

(22) Filed: Aug. 22, 2017

(65) Prior Publication Data

US 2017/0348599 A1    Dec. 7, 2017

Related U.S. Application Data

(63) Continuation of application No. 14/576,104, filed on Dec. 18, 2014, now Pat. No. 9,737,810.

(60) Provisional application No. 62/079,472, filed on Nov. 13, 2014.

(51) Int. Cl.
| | |
|---|---|
| *A63F 13/00* | (2014.01) |
| *A63F 13/497* | (2014.01) |
| *A63F 13/847* | (2014.01) |
| *A63F 13/87* | (2014.01) |

(52) U.S. Cl.
CPC .......... *A63F 13/497* (2014.09); *A63F 13/847* (2014.09); *A63F 13/87* (2014.09)

(58) Field of Classification Search
CPC ........ A63F 13/46; A63F 13/48; A63F 13/497; A63F 13/56; A63F 13/67; A63F 13/79; A63F 13/798
See application file for complete search history.

(56) References Cited

U.S. PATENT DOCUMENTS

| | | | |
|---|---|---|---|
| 2010/0160038 A1* | 6/2010 | Youm | A63F 13/10 463/29 |
| 2013/0178281 A1* | 7/2013 | Ayyar | A63F 13/12 463/30 |
| 2014/0364237 A1* | 12/2014 | Read | A63F 13/00 463/40 |

* cited by examiner

*Primary Examiner* — James S McClellan
(74) *Attorney, Agent, or Firm* — Martine Penilla Group, LLP

(57) ABSTRACT

Methods for allowing a user to participate and change outcome of an asynchronous game includes receiving an indication of an attack initiated by a second player on a first player's game base during game play. In response, a first social post is generated to inform friends of the first player of the attack and request assistance to defend the first player's game base. An acceptance to defend the first player's game base is detected from a third player at the first social post. In response, game replay of the attack by the second player is initiated and the third player is enabled to participate in the game replay and defend the game base of the first player. A second social post is generated to inform the first player and the friends of the first player of the third player's contribution in defending the first player's game base.

15 Claims, 16 Drawing Sheets

ASYNCHRONOUS ONLINE GAME PLAY AND DEFEND MODE PROCESSING TO ENABLE SOCIAL FRIENDS TO ASSIST AND ALTER GAME PLAY OUTCOMES

CLAIM OF PRIORITY

This application is a continuation of U.S. patent application Ser. No. 14/576,104, filed on Dec. 18, 2014, and entitled, "ASYNCHRONOUS ONLINE GAME PLAY AND DEFEND MODE PROCESSING TO ENABLE SOCIAL FRIENDS TO ASSIST AND ALTER GAME PLAY OUTCOMES," which claims priority from U.S. Provisional Patent Application No. 62/079,472, filed on Nov. 13, 2014, and entitled "ASYNCHRONOUS ONLINE GAME PLAY AND DEFEND MODE PROCESSING TO ENABLE SOCIAL FRIENDS TO ASSIST AND ALTER GAME PLAY OUTCOMES," which are incorporated herein by reference in their entirety.

FIELD OF THE INVENTION

The present invention pertains to gaming in a networked environment. More particularly, the present invention pertains to providing players with ability to asynchronously game play an online interactive game and to seek assistance from other players in altering game play outcomes of the game.

BACKGROUND OF THE INVENTION

There are a variety of social networking games available to the public at this time. Some games are designed to allow a player to play against another player (player vs. player). Some other games are designed to allow a player to play against the computing device on which the game is executed (player vs. machine). In both versions of game design, once the game is played, the outcome of the game remains static and cannot be changed.

It is in this context, the embodiments of the invention arise.

SUMMARY

Methods, systems, devices, and computer programs are presented for providing a replay of an online game and allowing a user to interact with and alter the outcome of the game play. The game may be of the invade-and-conquer type of game where a first player builds his game base with resources (essential and non-essential) and a second player invades/attacks the game base to destroy some or all of the resources, conquer the game base and/or to steal the resources to strengthen his own position and game base within the game. A game replay may be initiated and a third player may be allowed to assist in defending the game base of the first player, during the game replay, to alter the defensive outcome of the attack by the second player so that any damage inflicted or resources lost at the game base may be minimized/recovered.

The various embodiments described herein provide a synchronous simulation of a game that is played asynchronously. The synchronous simulation is enabled by allowing a replay of the asynchronous game play in which the first player's game base was attacked and allowing the third player to use his/her own resources to jump in and defend the game base of the first player potentially changing the outcome of the game by minimizing the damage and/or loss of resources at the game base. The interactions of the third player are used to counter the attack by the second player, thereby leaving the third player with the satisfaction of having actively participated in defending the game base of the first player. The third player's contribution benefits the first player as the defense of the game base may help in alleviating the loss of the resources of the first player.

It should be appreciated that the present embodiments can be implemented in numerous ways including methods, apparatuses, systems, devices, or computer program on computer readable medium. Several exemplary embodiments are described below.

In one embodiment, a method is disclosed. The method includes detecting establishment of a game base of a game by a first player. The game base is established using resources selected by the first player, for the game. Interactions at the game base are monitored to determine if a second player approaching the game base is attempting an attack on the game base of the first player. A request for assistance to defend the game base of the first player is issued, upon detecting the attempted attack on the game base by the second player. The assistance is being requested from social contacts of the first player. A response is received from a social contact of the first player who has responded to the request for assistance. A replay of a portion of a game play of the game is generated for the social contact that includes an attack on the game base by the second player, to provide the social contact with context regarding the game play that led up to the attack. The social contact is enabled to defend the game base from the attack. The defending of the game base produces an outcome for the game play which includes actions taken to defend the attack.

In another embodiment, a computer program embedded in a non-transitory computer-readable storage medium is disclosed. The computer program includes program instructions for detecting establishment of a game base of a game by a first player, wherein the game base is established using resources selected by the first player for the game; program instructions for monitoring interactions at the game base to determine if a second player approaching the game base is attempting an attack on the game base of the first player; program instructions for requesting assistance to defend the game base of the first player, upon detecting the attempted attack on the game base by the second player, the assistance being requested from social contacts of the first player; program instructions for receiving a response from a social contact of the first player who has responded to the request for assistance; program instructions for generating, for the social contact, a replay of a portion of a game play of the game that includes an attack on the game base by the second player, to provide the social contact with context regarding the game play that led up to the attack; and program instructions for enabling the social contact to defend the game base from the attack and produce an outcome for the game play which includes actions taken to defend the attack.

Other aspects will become apparent from the following detailed description, taken in conjunction with the accompanying drawings.

BRIEF DESCRIPTION OF THE DRAWINGS

FIGS. 4E-1 and 4E-2 illustrate exemplary online screen representation of messages sent in the first social post and the second social post, in accordance to embodiments of the invention.

DETAILED DESCRIPTION

Figure 1:
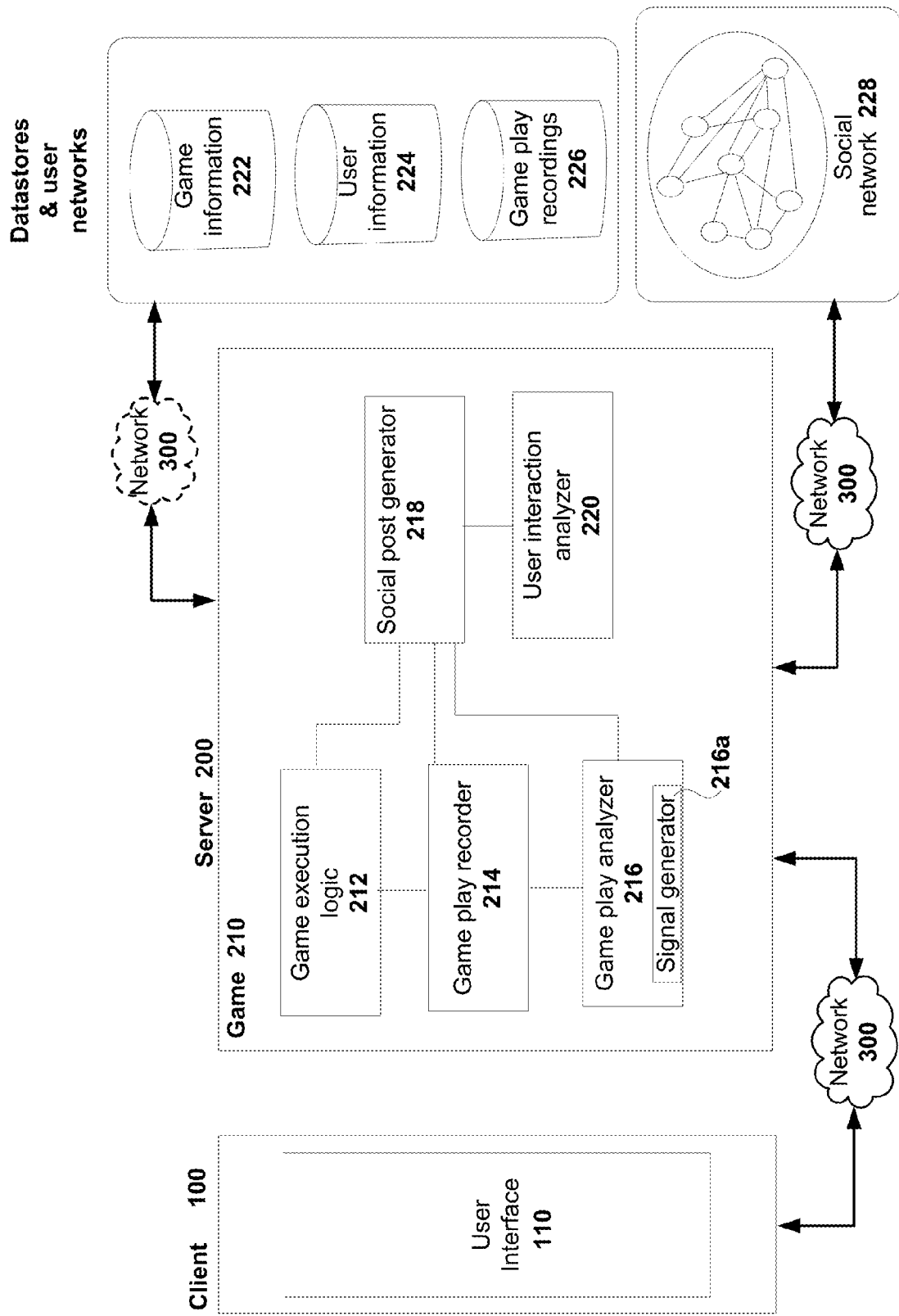
FIG. 1 illustrates an exemplary system for executing a game application that allows a player to assist in defending an attack and change an outcome of the game, in accordance with an embodiment of the invention.

The following embodiments describe methods, devices, systems and computer programs for enabling a user to assist in changing an outcome of a game that was played asynchronously between two players. It will be apparent that the present embodiments may be practiced without some or all of the specific details. In other instances, well-known process operations have not been described in detail in order not to unnecessarily obscure the present embodiments.

The embodiments relate to game play of an online video game, wherein a first player establishes his own game base using resources that the first player unlocks, purchases or obtains during game play and a second player initiates an attack on the game base to destroy the resources, defeat the first player and/or steal the resources of the first player. A third player is provided with an ability to mitigate the losses suffered by the first player at his game base during attack by providing a game replay of the attack, allowing the third player to assist the first player in defending the game base under attack and changing the outcome of the game during the game replay. The game may be of the attack-and-defend type or invade-and-conquer type of game that is played asynchronously. In such a game, the first player builds his game base with resources and goes offline soon thereafter. A second player invades/attacks the game base to conquer the game base and/or to steal the resources. The stolen resources are used by the attacking player to strengthen his own game base and improve his status/position within the game. It should be noted that although the various embodiments are described with reference to a specific type of game, the embodiments can be extended to other types of games that are played between players (player vs. player) and between players and computers (player vs. computer) in which players try to overcome adversities and win the game.

The resources associated with each player, in some embodiments, may include essential resources required for game play, such as resources required to establish a game base, etc., defensive resources to defend the various resources established in the game base and offensive resources to invade and attack the game base of other players. The essential resources may include buildings and services (for example, one or more of office buildings, government buildings, residential buildings, game base headquarter, reservoirs, weapon stores, hospitals, libraries, schools, pharmacies, clinics, other service buildings, etc.) that may be used to define and customize the game base. The offensive and defensive resources may include towers, walls, gates, troops, trucks, tanks, guns, ammunitions, ships, planes, artilleries, etc., that are used to initiate an attack and/or to defend from an attack.

While establishing the game base, a player carefully places the essential and defensive resources strategically across the game base to avoid an attack and/or to successfully defend key resources from being destroyed during an attack from other players during game play. In some embodiments, the defensive resources may include virtual sensors/cameras, or other type of artificial intelligence enabled mechanisms that may be used to automatically detect an attack and to engage the defensive mode of the resources to defend the game base.

A combat may be initiated between a first player and a second player when the second player decides to attack the first player's game base. During combat, the second player enters into an offensive mode and deploys the offensive resources at different locations in the game base of the first player. The AI mechanisms within the defensive resources deployed around the game base may detect the attack and automatically engage the resources in defensive mode to try and defend the game base. Based on the resources and strategies used in the combat, the first player may be successful in defeating the second player by destroying the defensive resources of the second player that are engaged during the attack. The successful defense by the first player's resources is reflected in an increase in the points/powers/command points, etc., awarded to the first player and/or resources added in accordance to the win and the second player's points/powers/command points are decreased and/or resources reduced to reflect the defeat. Alternately, the second player may defeat the first player by destroying or overcoming the defenses established by the first player or by destroying certain amount of resources at the game base, or by taking over control of some of the key resources, such as the headquarter. Consequently, the second player's points/powers/command points are increased and/or resources added in accordance to the win and the first player's points/powers/command points are decreased and/or resources reduced to reflect the defeat. In one embodiment, the game is played asynchronously, wherein after the game base has been established by the first player and the first player goes offline, the second player attacks the established game base.

In some embodiments, the second player is allowed to attack the game base of the first player after having successfully enrolled to play the game. In other words, the second player should be a registered player for the game before the second player is allowed to interact in the game. In some embodiments, the second player may or may not have established his own game base and may be attacking other players' game bases to "steal" the resources to establish or strengthen his game base. The game play is recorded and a video recording of the game play including the game play associated with the combat is made available for review and replay.

Consequent to the occurrence of the attack, a first social post may be generated to inform one or more social contacts, friends, alliance (collectively called "social contacts" or "friends") of the first player that an attack has occurred at game base of the first player. The first social post may also include a request seeking assistance from the one or more social contacts of the first player to defend the game base of the first player. The request includes a link to the video recording of the attack. The first social post may be sent to the social contacts in a social feed, in an email, a short message service (SMS) text to the social contacts mobile device, a message on a message feed, or may use any other social channel for informing the social contacts about the attack.

When one of the friends or social contacts accepts to defend the game base by responding to the request, a game replay of a portion of the game that includes the attack is initiated. The game replay allows the responding social contact to synchronously interact with the game presented in the game replay and defend the game base. The social contact, at this time, may engage his resources in a defensive mode and interact to defend the game base from the attack initiated by the second player, potentially affecting the outcome of the game. The game replay re-starts a portion of the game which includes the attack and replays the second player's attack on the game base while allowing the social contact to interact and defend the game base from the second player's attack. The game replay takes into account the interactions of the social contact at the game base and adjusts the outcome of the game accordingly. The social contact's interactions during game replay may result in destroying the second player's resources and/or saving the resources of the first player. This collaborative game play allows the social contact to increase his own resources and/or game points/powers/commands as well as minimize the loss of resources of the first player The synchronous simulation is captured in a combined video recording that includes the interactions at the game base involving resources of the first and the second players as well as interactions involving the resources of the social contact. Upon completion of the game replay, a second social post is generated and includes the combined video recording of the game replay. The second social post is sent to the first player and to the social contacts of the first player informing of the attack and the defensive assistance provided by the social contact. In one embodiment, the first player is made aware of the attack on his/her own game base by the second social post. In this embodiment, the first social post informing of the initial attack is not provided to the first player. In another embodiment, the first player may be provided with the first and the second social posts that inform him of the attack on his/her game base and the defense assistance provided by his friend (i.e., social contact).

The embodiments, thus, enables a collaborative game play of an asynchronous game by allowing a social contact of a user under attack to come to the user's defense by enabling the social contact to participate in a simulated synchronous replay of the game and, in the process, change the outcome of the game. The attacking player (i.e., second player) will be rewarded with the wins resulting from an attack on the first player's game base. The social contact will enjoy the wins resulting from successfully defending the game base of the first player during game replay and the first player is allowed to keep the resources that were saved from the attack. In some embodiments, depending on the success of the defensive game play by the social contact, resources may be added back to the first player's game base or lost points of the first player recuperated. The game play may continue till the game base is completely or substantially destroyed, the second player is defeated or upon expiration of a pre-defined battle timer.

Conventional invade-and-defend type of games allowed the game play between various players and even allowed collaboration with other players during game play. However, outcome of such game plays were static in nature and could not be changed after the initial game play. The current embodiments allow the outcome of the game play to be changed after an initial game play by, (a) providing a replay of the attack on the first player's game base, (b) providing options to allow the social contact to come to the defense of the first player by simulating synchronous game play, and (c) using the synchronous game play to affect the outcome of the game.

With the brief description of the invention, details of the various embodiments will be described with reference to various drawings. FIG. 1 illustrates a system used for allowing a user to assist in a game that was played asynchronously between two players and, in the process, change the outcome of the game. The system includes a server 200, such as a game server, on which an interactive game 210 is executed. The game server 200 may be a local game console, a remotely located game server that can be accessed via a network, or a game server in a cloud accessed over the network. In some embodiments, the game may execute locally on a computing device of a user from where the user is accessing the game. A user interface 110 on a client device 100 allows the user to access and interact with the game 210 and such access may be local or over a network 300, such as the Internet, depending on the location from where the game is executed. When a user desires to access and play a game 210, the user may be authenticated using user related information obtained from the user information data store 224 before the game 210 is provided for game play. In response to user selection of a desired game 210, game related information for the selected game is obtained from a game information data store 222 and the game is set up in accordance to the game rules specified for the game 210 for game play. Of course, the one or more data stores and user networks may be accessed locally on the server 200 or may be accessed over network 300, depending on where the data stores and information related to social networks are maintained.

The game 210 includes a plurality of modules that are used to execute the game, allow game play, detect user interaction during game play and affect game outcome based on the user interaction. Some exemplary modules of the game include game execution logic 212, game play recorder 214, game play analyzer 216, social post generator 218 and user interaction detector/analyzer 220. The various modules associated with the game interact with one another and with the one or more data stores, such as the game play recording data store 226, user information data store 224, game information data store 222, etc., and with the social network 228 to obtain various user-related and game-related data to authenticate users, to identify users/players/social contacts for forwarding the social post, and to provide the necessary game replay to allow a third player to successfully interact with the game presented in the game replay to change the outcome of the game.

The game execution logic 212 provides executable code for instantiating the game on the server, game console or local computing device, when selected. The executable code includes game code that provides logic for successful execution of a game on the game server to enable game play of the game in accordance to the game rules defined within the game logic and awarding points/commands powers based on the performance of players during game play. The game execution logic 212 is used to define game scenes, game characters, game objects, game object attributes, game state data, game object state, game levels, graphic overlay, game attributes of the game, etc. The game, in one embodiment, may be an invade-and-conquer type of game that can be played asynchronously. The game execution logic 212, in this embodiment, provides the user with necessary game tools, game resources, and game rules for identifying an area within a game scene for setting up a game base and for defending the game base. The game execution logic 212 may include built-in artificial intelligence (AI) for monitoring activities on the game base, detecting user interaction at a game base, determine if the user interaction amounts to an attack on the game base and to engage the resources within the game base to defend the game base.

The game play recorder 214 is configured to detect initiation of the game play of the game and record the game play. The game play recorder 214 records both the asynchronous game play as well as the synchronous game play. Thus, the recordings of the game play by the game play recorder captures first player's interactions during and after the set up of the game base as well as the interactions that are automatically triggered by the resources while defending the game base when the first player goes off line after setting up the game base. The game play recorder 214 also captures the interactions of other players as they attack the game base of the first player during asynchronous game play and the interactions of other players as they defend the game base during game replay.

In some embodiments, the interactions that are automatically triggered by the resources may be initiated by the AI mechanisms/logic that is built into the resources. The AI mechanism/logic is configured to monitor the interactions at the established game base during game play to determine if the interactions are from a resource on the game base or from a resource outside of the game base and whether the resource is engaged in an offensive mode or in a non-offensive/defensive mode. When it is determined that an outside resource is being used in an offensive mode, the AI mechanism engages the resource in a defensive mode causing the resource to defend the game base from the attack.

The attack is asynchronous in nature as the second player is launching the attack on the first player's game base affecting the outcome of the game while the first player is offline. The outcome of the game is affected based on how successfully or unsuccessfully the game base was defended by the resources that were strategically placed/provided in the game base. Based on the outcome of the game play the wins/losses of the winning/losing player are adjusted including adjusting resources, game points, game levels, game commands/powers, etc.

The game play analyzer 216 is configured to analyze the game play to determine whether the first player or the second player was successful in the combat. The first player may be considered to have been defeated when substantial amount of resources provided in the game base were lost or destroyed, when key resource targets were attacked and destroyed, when the defensive resources were compromised, etc. Similarly, the second player may be considered to have been defeated when a pre-defined amount of the second player's used in the attack have been destroyed or captured. The above list for determining the unsuccessful attempt by the first player is exemplary and that other conditions may be used to declare the first player's attempt to defend the game base or the second player's attempt to defeat the game base as unsuccessful. Based on the outcome of the game play, the winning player's game points/powers/commands may be increased and/or one or more resources added while the losing player's game points/powers/commands may be decreased and/or one or more resources removed. The interactions of the second player during the attack, the first player's defense of the game base in response to the attack, and the outcome of the game play are captured by the game play recorder. The recording of the game play may be stored in one or more of a game play recording data store, in a session data store, in a game data store, in a user data store, etc., and used for future mining and usage.

When it is determined that the first player's resources were unsuccessful in defending the game base, a signal may be generated and sent by the game play analyzer 216 to the social post generator to generate a social post for informing the social contacts of the first player about an attack on the game base of the first player. The signal may be generated using a signal generator 216*a*. It should be noted that the social post is for informing the social contacts about the unsuccessful outcome of the initial asynchronous game play.

The social post generator 218, in response to the signal regarding the unsuccessful attempt, may interact with one or more social networks 228 to identify one or more social contacts (i.e., "friends") of the first player, may interact with the game play recording data store 226 to obtain a video recording of the game play capturing the attack on the first player's game base and the first player's defeat and generate a first social post. The game play captured in the video recording identifies a portion of the game that includes the attack by the second player on the game base of the first player. The social post generator 218, while generating the first social post, provides a link to the game replay that includes the executable game code for game replay of the portion of the game in which the attack was initiated, as well as the game changes caused by the interactions captured during the second player's attack on the game base of the first player. The interactions include interactions of the second player attacking the first player's game base and the first player's response while defending the game base during the attack. The first social post also includes a request for assistance to defend the game base. The request may be provided in the form of a call-to-action (CTA) button, such as a "Defend a Friend" button provided within the social post and the link to the game replay may be embedded in the CTA button. In one embodiment, the social post may also include a link to the video recording of the attack on the game base to allow the social contact to view the attack prior to responding to the request to defend the game base. User interaction at the CTA button triggers the execution of the game code for game replay and allows any one of the social contacts to synchronously interact with the game replay to defend the game base from the attack by the second player. The generated first social post is presented to the social contacts of the first player identified from the one or more social networks.

In one embodiment, the first social post is forwarded to the social contacts of the first player and not to the first player. In one embodiment, only select ones of the social contacts of the first player are presented with the first social post. For example, only few of the social contacts of the first player may be willing, available, have the necessary skill set, interest to assist in defending the game base and such social contacts are identified the social post forwarded to these identified social contacts. In another example, the social contacts that consistently provided assistance during previous game plays may be identified and the first social post forwarded to the selected ones of the social contacts. In one embodiment, the social contacts may be selected from one or more social networks based on the geo location of the first player or the second player or based on the in-game geo location. In one embodiment, the social contacts may be alliances identified from one or more game networks instead of or in addition to the social contacts identified from one or more of the first player's social networks. In one embodiment, the social contacts/alliances may be selected from the game network based on the skill level, having similar demographic attributes as the first player, geo-location, availability, etc.

In one embodiment, the first player is not made aware of any attack on his game base while the player is offline. In an alternate embodiment, the first player is made aware of the attack on his game base. In this embodiment, the social contacts of the first player are presented with the first social post that includes a link to the game replay of the attack and a request for assistance, while the first player is provided with only an informative message about an attack on his game base. In this embodiment, the message to the first player does not include any of the links that are sent to the social contacts of the first player.

The social post may be presented in a social feed, in an email, as a Short Message Service (SMS) text to a mobile device, alliance chat, or through any other social media or communication channels that can be used to inform the social contacts/alliances.

When any one of the social contacts interacts with the request provided in the social post, the user interaction/analyzer module 220 detects the interaction by the social contact. The detection, in one embodiment, causes automatic rendering of the game replay for the portion of the game, on the user interface 110 of a display screen associated with the client device of the social contact, to allow the social contact to synchronously interact with the game play and defend the game base of the first player. The social contact's interactions provided during the game replay are used to adjust the game scene and the outcome of the game. The game replay is recorded and stored in the game play recordings 226 for future mining and sharing. The video recording of the game replay captures the interactions associated with the second player attacking the game base of the first player, the defensive mode interactions of the first player's resources engaged in defending the game base, and the interactions of the social contact that responded to the request and actively defended the game base. The outcome of the game replay is analyzed by the user interaction analyzer 220 and the game play analyzer 216 to determine the nature and type of interactions provided by the third player and whether the strategies and resources used by the third player were sufficient to, (a) prevent the attack on key resources at the game base, (b) save/preserve the resources at the game base and of the third player, (c) successfully attack and destroy the resources of the second player, or (d) if they were insufficient to ward off the attack.

Depending on the effect of the third player's interactions in the game play, the game points/commands/powers are awarded to the appropriate player(s), and/or the resources are adjusted. For example, if the third player was successful in preventing or minimizing resource loss at the game base from an attack, then the third player is awarded the game points/commands/powers and/or resources that the third player was instrumental in saving/defending. The awards may be in accordance to pre-defined game rules and may be based on the number and/or type of resources saved. In this example, the initial game play of the attack may have resulted in certain resources of the first player being attacked and lost. Consequent to the third player's participation, some or all of the first player's resources that were lost in the initial attack may have been won back (i.e., saved) and the resources that were saved by the third player are restored to the game base of the first player. Additionally, a portion of the saved resources may be awarded to the third player to strengthen his own base. It should be noted that the second player's game state and game winnings are not affected from the replay of the game that includes third player's participation. This is due to the fact that the second player's participation was asynchronous and resulted in an outcome that the third player is trying to change through a simulated synchronous game play.

The combined video recording capturing the interactions of the first, the second and the third players, is generated when the user interaction analyzer 220 detects the completion of the game play. In one example, the user interaction analyzer may declare the game play as being completed when at least one of the pre-defined conditions is met. The pre-defined conditions may include verifying to see if amount of resources in the game base that were lost/defeated meets or exceeds a pre-defined threshold, amount of essential resources lost in the game base exceeds a pre-defined threshold, amount of a particular type of resource of the second player destroyed by the third player exceeds a pre-defined threshold, a key resource at the game base was captured or destroyed, or if a pre-defined combat or battle timer has expired. The aforementioned conditions are exemplary and should not be considered restrictive. Other conditions may also be specified to determine the completion of the game play. In one embodiment, upon completion of the game play, the third player is returned to his own game base and the game state of the third player is updated to reflect the wins or losses he experienced while defending the game base of the first player. Similarly, the first player's game state is updated based on the outcome of the game resulting from the third player's participation. The updating of the game state may be performed by the game execution logic 212 based on the analysis information provided by the user interaction analyzer 220 and game play analyzer 216.

In one embodiment, the video recording provided in the first social post presents an integrated view of game play that captures interactions involving the resources of the first player available in the game base and the resources of the second player that is used to attack the game base. The combined video recording provided in the second social post presents an integrated view of game replay that captures interactions involving the resources of the first player available in the game base, the resources of the second player that was used to attack the game base and the resources of the third player that is used to defend the game base during the attack. The video recording and the combined video recording may also provide status of each of the players involved in the game play of the game at the time the respective videos of game play were captured.

The social post generator 218 in association with the game play analyzer 216 recognizes the completion of the game replay and, in response, generates a second social post. The second social post includes a link to the combined video recording of the portion of the game that includes the defensive moves used in defending the game base during the attack and is provided to the first player and the social contacts of the first player in the respective social feed. The second social post is used to inform the first player and his social contacts about the attack on the game base of the first player by a second player and the assistance that the third player provided in defending the game base. In some embodiments, the identity of the first player, second player and the third player may also be included in the second social post, and such identity may include one or more user attributes, such as user name, screen name, avatar, geo location, skill level, etc.

In one embodiment, the first social post informing of the attack is generated when more than a pre-defined threshold amount of resources or particular type(s) of resources have been attacked and destroyed or rendered inoperable. In one embodiment, the links provided in the first social post may allow a third player to view the video recording of the attack one or more times to determine the type of attack initiated by the second player, prior to providing access to the portion of the game for game replay. This feature allows the third player to evaluate the attack, determine the defense strategy to employ prior to responding to the request to synchronously participate in the game replay. In another embodiment, the first social post allows the third player to access and synchronously participate in the game replay of the portion of the game that includes the attack by the second player. In this embodiment, the third player is given only one opportunity to assist in defending the game base of the first player. In this embodiment, when the third player interacts with the request provided in the first social post, the request with the link to the game replay is removed from the first social post for the third player. In an alternate embodiment, the third player may be provided with multiple opportunities to assist in defending the game base of the first player by maintaining the request within the first social post of the third player even after the third player has responded to the request to defend the game base once.

In one embodiment, the second social post is generated upon determining completion of the replay of the portion of the game involving the third player. The social post generator 218 generates the second social post and forwards the second social post to the first player and the social contacts of the first player in their respective social feeds or through other communication channels, such as email, SMS text, alliance chat, etc. In this embodiment, the second player that attacked the first player's game base is not provided with the second social post. In an alternate embodiment, the second social post may be provided to the second player, if the second player is a social contact of the first player, just to inform him of the status of the game after his attack on the first player's game base. By providing the second social post to the second player, the game play is made more interesting as the second player, informed of the third player's defense, may try to strategize and use his resources to launch further attacks on the first player and/or the third player. For example, if the third player has always come to the defense of the first player, it would make it more interesting for the second player to attack and destroy the resources of the third player in addition to attacking the first player's game base, thereby keeping the players engaged and involved in strategizing their attacks/defense.

In some embodiments, in response to forwarding the first social post to a plurality of social contacts of the first player, more than one social contact may respond to the request for assistance. In such embodiments, each one of the social contacts is provided with a link to the game replay of the attack and the request allows the social contacts to independently assist in defending the game base of the first player that is under attack. The link causes presentation of the game replay of a portion of the game in which the second player attacks the first player's game base and allows each of the social contacts to synchronously interact with the game replay. Each social contact's game replay is captured in a video and a combined video recording for each of the social contacts is generated. The combined video recording of each of the social contacts is stored in the game play recordings 226. The social post generator 218 along with the game play analyzer 216 analyzes the combined video recordings from the social contacts to determine which one of the social contacts was able to successfully defend the game base of the first player. If more than one social contact was able to successfully defend the game base, then the social contact that provided the maximum defense may be identified and the combined video recording that captures the contribution of this identified social contact is included in the second social post generated to inform the first player and the social contacts of the first player about the attack and the defense provided by the social contact. If, more than one social contact was able to provide the same amount of maximum defense, then the social contact with the highest level or the lowest level, or the highest/lowest rating may be selected for inclusion in the combined video recording, based on pre-defined rules.

In one embodiment, only the identified social contact may be awarded points, powers, commands, resources, etc., in accordance to the level of defense provided by the identified social contact. The current status of points, powers, commands, resources of the identified social contact including the wins from the defensive play are presented on a display screen of the identified social contact. In one embodiment, in addition to including the combined video recording of the identified social contact, the second social post may also provide information about the social contacts that came to the first player's defense during the attack. This information may allow the first player to know which ones of his social contacts assisted in defending his game base.

In another embodiment, when more than one social contact comes to the aid of the first player in defending the game base, each one of the social contact that successfully defended the game base may be awarded points, powers, commands, resources, etc., in accordance with the amount of defense provided. The awarded points, powers, commands, resources, etc., are presented on a display screen of the respective social contacts to provide a current status of the respective social contacts. In this embodiment, the resources to the game base of the first player, game points/powers/commands recovered for the first player may be in accordance to a specific one of the social contact that provided the maximum defense. The assistance provided by the social contact in defending the game base of the first player not only benefits the first player but also benefits the social contact by providing a way for the social contact to strengthen his own game base and position in the game by allowing him to win points, powers, commands and resources making this a truly win-win game play for everyone involved.

In one embodiment, when the social contact does not respond to the first social post provided in the social feed for a pre-defined period of time (for e.g., a day, 6 hours, 1 week, etc.), the non-response may be used as an indication that the social contact is not interested in responding to the request. Based on this determination, the request may be removed from the first social post of the social contact after passage of the pre-defined period of time. In this embodiment, when the social contact interacts with the first social post after the expiration of the pre-defined period of time, only the link to the video recording of the attack is presented to allow the social contact to view the attack replay. The social contact is not provided with a linkage to the portion of the game to assist in defending the game base of the first player.

In one embodiment, the outcome of the game play that includes the interaction of a third player is determined by identifying one or more of the number of resources of the second player that were destroyed by the third player during game play, number of resources of the first player that the third player saved, number of key resources of the first player that the third player saved, number of resources of the third player used in the game play, number of resources of the third player that were destroyed during game play, amount of time taken to defeat the second player, etc. In some embodiments, the points, powers, commands, resources are awarded to the third player in accordance to the outcome.

In one embodiment, the game play recorder 214, game play analyzer 216, social post generator 218 and user interaction analyzer 220 may all be part of the game 210, as illustrated in FIG. 1. In another embodiment, game play recorder 214, game play analyzer 216, social post generator 218 and user interaction analyzer 220 may all be part of a separate module, such as a game analysis module (not shown), that interacts with the game execution logic 212 to provide the social posts to the players of the game. In some embodiments, the different modules of the online interactive game may be defined as hardware components, software components, firmware, embedded logic components, or a combination of two or more such components for carrying out the technical operations of the game. The various modules/components may be provided on a single server or multiple servers that may be accessed using network infrastructure through wired or wireless connections. The server may be a local device, such as a game console connected to a client device, or a remote server (for e.g., cloud server) that can be accessed using the network resources. In some embodiments, the various modules of the game may be executed on a client device itself.

Figure 2A:
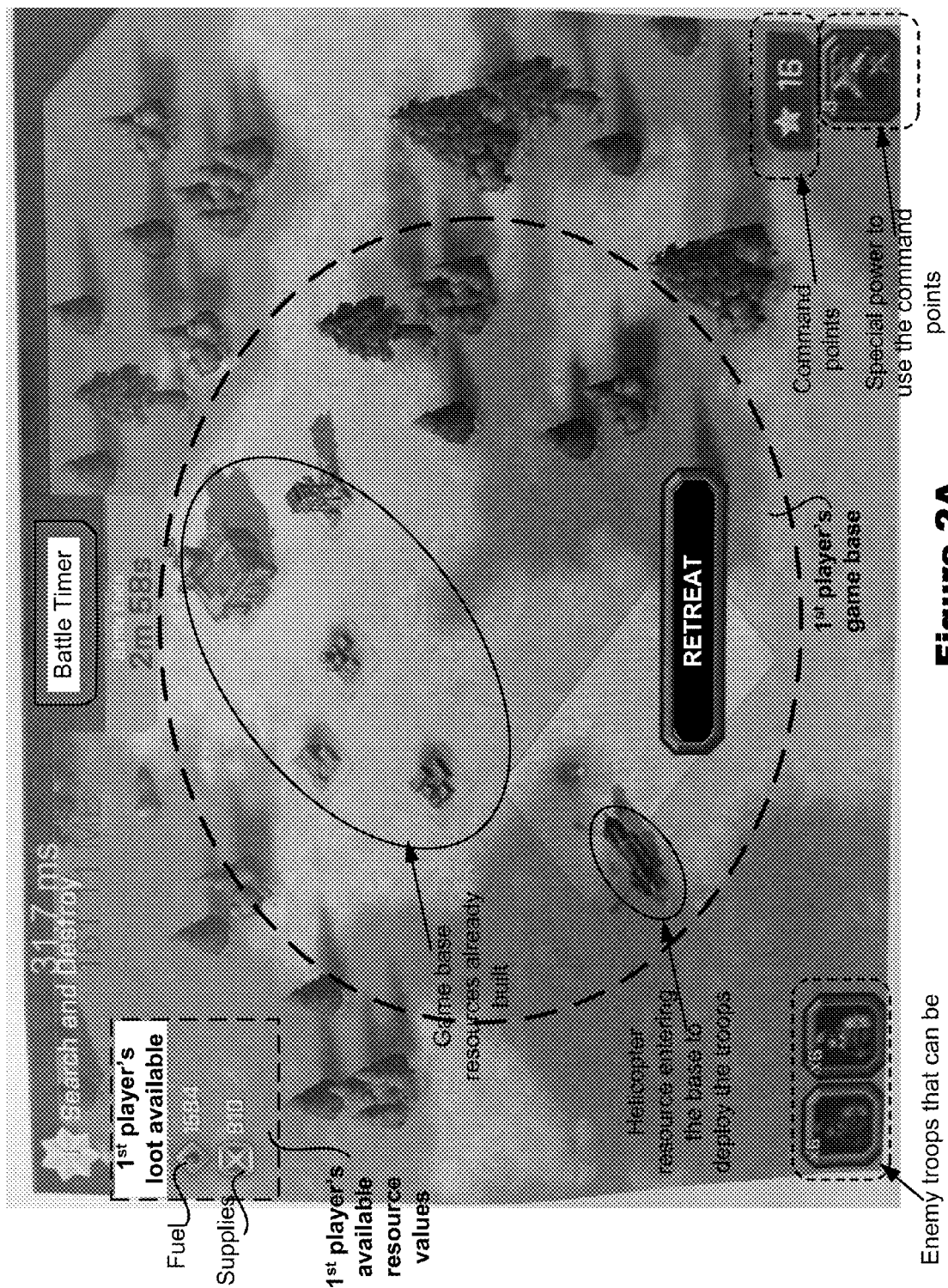
FIGS. 2A and 2B illustrate online screen representation of an exemplary game base of a game set up by a first player over time, in accordance to an embodiment of the invention.

FIG. 2A illustrates an exemplary game scene of a game rendered on a display portion of a client device. The game scene identifies an area on which the first player is allowed to define and build his game base. The game scene also identifies some of the resources that are available to the first player to build his game base, the game status of the first player, including game points, game powers, game resources, game commands that are available to the first player for use during game play and for the second player to "steal". For example, as illustrated in FIG. 2A, the first player's available loot for the second player to steal include "Fuel" and "Supplies". These loot may be stored/defined in the game base. The game scene also identifies second player's resources that may be engaged to attack the game base. For example, as illustrated in FIG. 2A, enemy troops that are available for deployment or that are already deployed in the battle during attack of the game base may be separately identified in the bottom left corner of the game scene. Additionally, resources that are used to deploy other resources may be identified. For instance, in the example illustrated in FIG. 2A, a helicopter may have been used to deploy the second player's troops to the game base during the attack. Command points of the second player may also be rendered in the game scene during game play. In one example, the resources of the second player that are engaged in the battle are visible only to the second player. The command points may be special game points that may be exchanged for one or more special powers, which can then be used in the attack. The aforementioned resources of the first and the second player that are rendered in the game scene when the second player attacks the first player are exemplary and that fewer or additional information related to the game play during the attack may also be rendered. In one embodiment, in addition to providing the resources, a battle timer may be rendered to let the second player know the amount of time of game play that is available for defeating the first player. An option to retreat (for e.g., a "Retreat" button) from the game base may also be presented to allow the second player to withdraw his resources and retreat from the first player's game base before the second player suffers heavy damages. This option may allow the second player to save his resources and withdraw from attacking the game base of the first player when the second player realizes that he underestimated the defensive resources and tactics employed by the first player in defending the first player's game base.

Figure 2B:
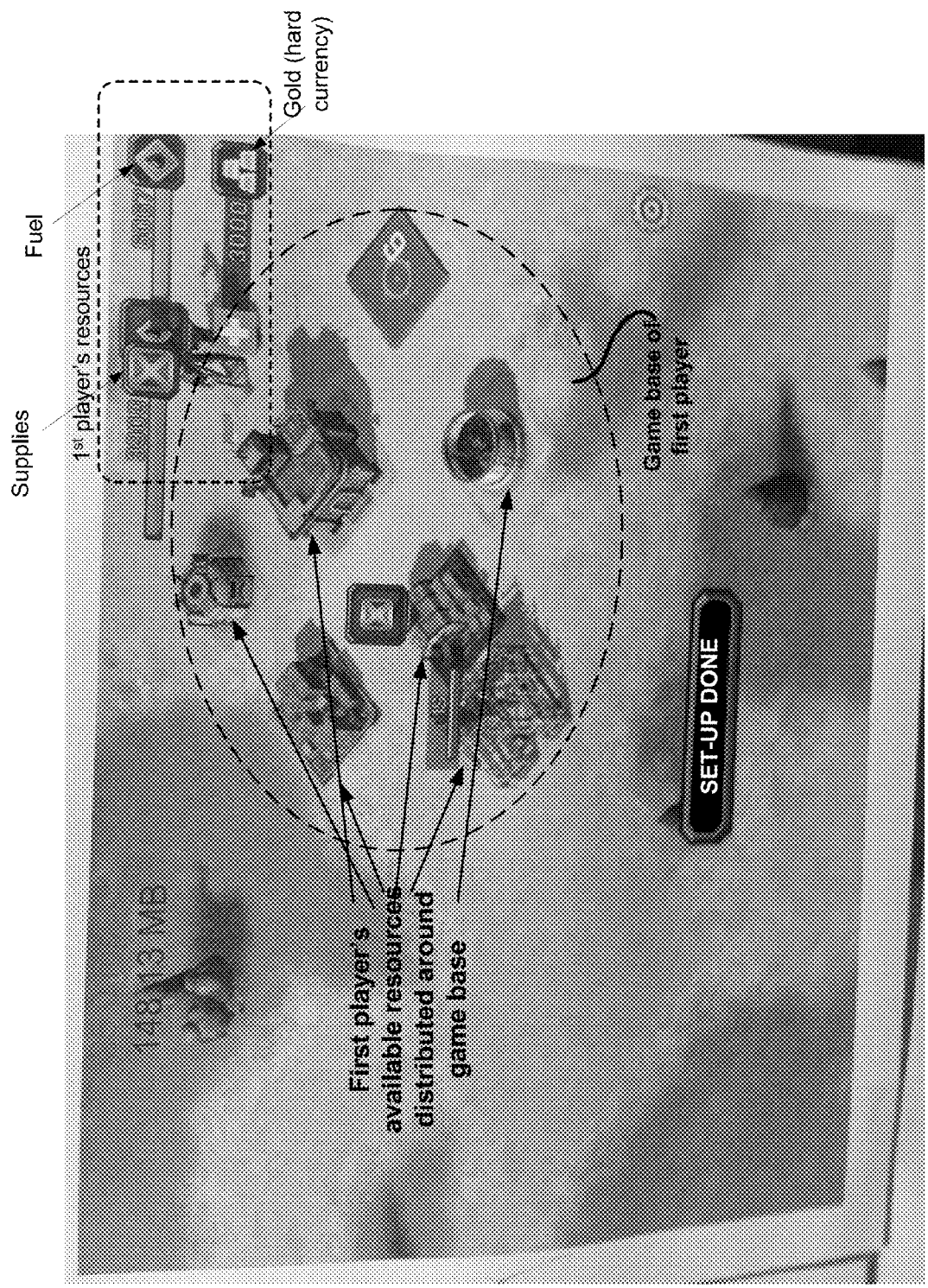

FIG. 2B illustrates an exemplary game scene identifying the game base of the first player as the first player continues to build his resources around the game base. The various resources include essential and non-essential resources/services as well as defensive resources for defending the game base. During the set-up of the game base, an option may be presented to the first player to allow the first player to exit out of the game play. In one embodiment, the option may be provided in the form of a "Set-up Done" button, which when selected allows the game application to save the resources that are still available to the first player and the game base built by the first player before letting the first player go off-line. The resources that may still be available to the first player including fuels, supplies, hard currency, etc., are shown in the upper right corner of the game scene presented in FIG. 2B. The exemplary resources that are available to the first player depend on the type of game that is being played and are not restricted to what is illustrated in FIG. 2B. Once the game base has been established and the first player goes off-line, the game base may be vulnerable to an attack from another player playing the same game.

Figure 3A:
FIGS. 3A and 3B illustrate exemplary resources that are available for purchase/use for setting up the game base and for defending/attacking the game base, in accordance to some embodiments of the invention.
Figure 3B:
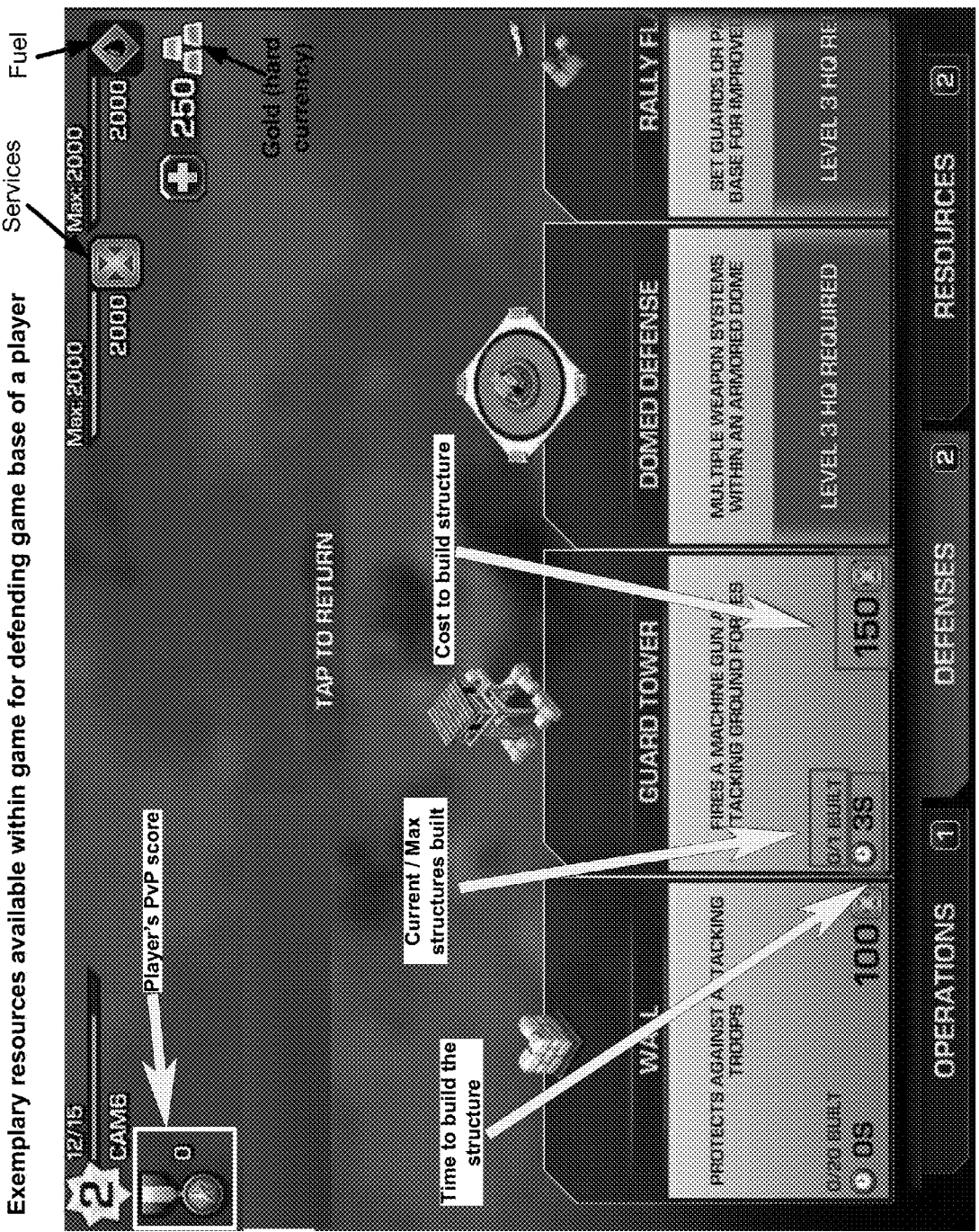

FIGS. 3A and 3B illustrate exemplary resources available for purchasing, trading-in, awarding a player (for e.g., first player, second player, a social contact of a first player, etc.) during game play. In one embodiment, each resource may be associated with a certain minimum level, a value for purchasing the resource (if any), an image, other resources that need to be expended to train or prepare the resource for deployment, amount of time required for training/preparing the resource for deployment, details of the resource, number of the resource that may be trained/prepared for deploying, etc. In some embodiments, the players may be allowed to purchase a resource as soon as they achieve the level specified for the resource. Alternately, the players may be allowed to trade-in one resource for another so long as the player is at or above the level that these resources are available. FIG. 3A illustrates some of the exemplary resources that are available including resources that can be engaged in either offensive mode or in defensive mode of operation and FIG. 3B illustrates exemplary resources that are available for engaging in only defensive mode. Additionally, the screen rendition shows the status of the player in the upper right hand corner to allow the player to determine which ones of the resources that are affordable for the player.

Figure 4A:
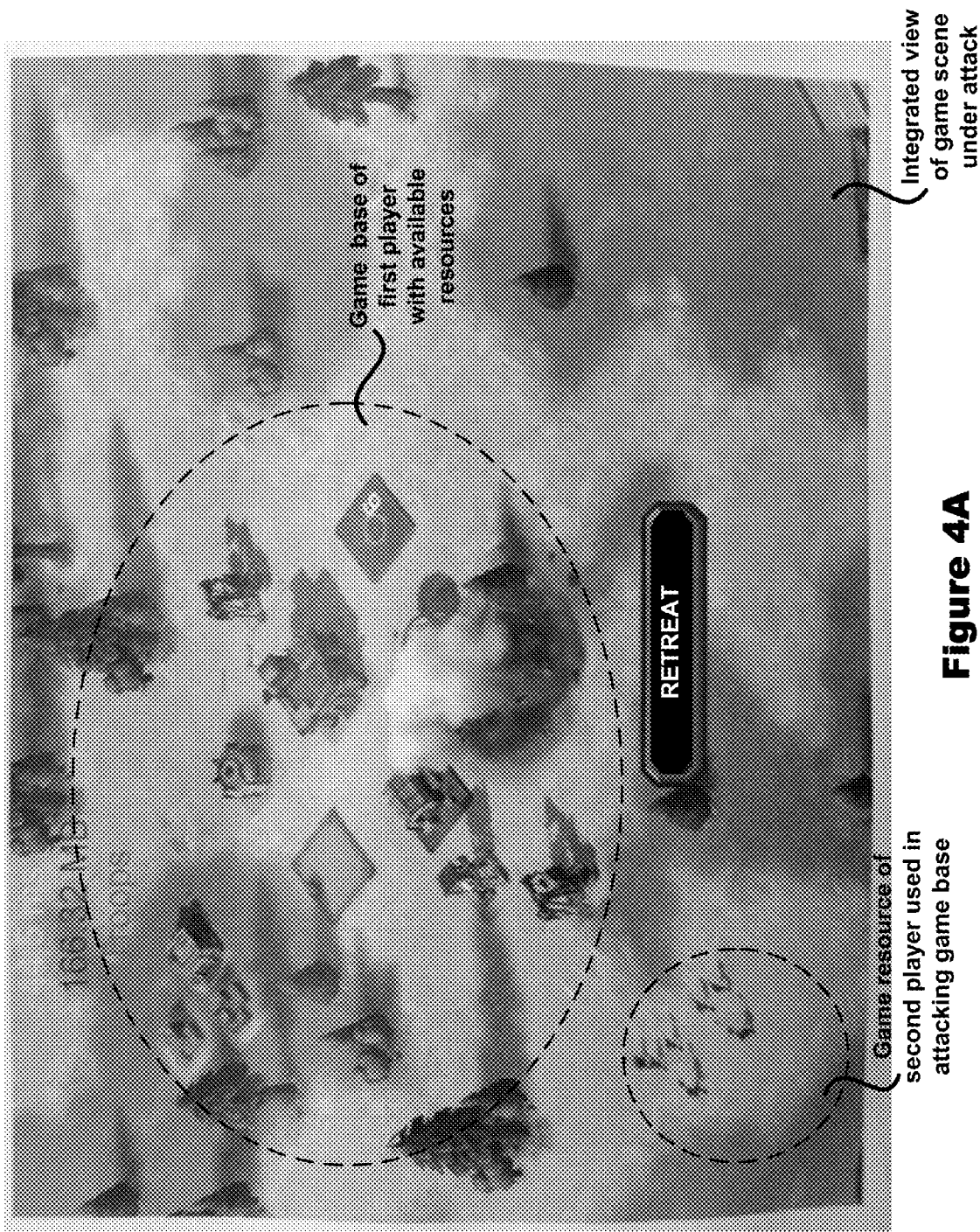
FIGS. 4A and 4B illustrate exemplary online screen representation of an attack on the game base of a first player during game play, in one embodiment of the invention.

FIG. 4A illustrates an exemplary game screen rendition of the first base being under attack, in one embodiment. The screen rendition shows an integrated view of a game scene that identifies the resources of the first player and the second player that are engaged in the battle. The game base identifies the various resources of the first player that have been used to establish the game base as well as to defend the game base and the resources of the second player that have been engaged in attacking the first player's game base. In the embodiment illustrated in FIG. 4A, the resources that have been engaged by the second player include armed troops for leading a ground attack on the game base.

Figure 4B:
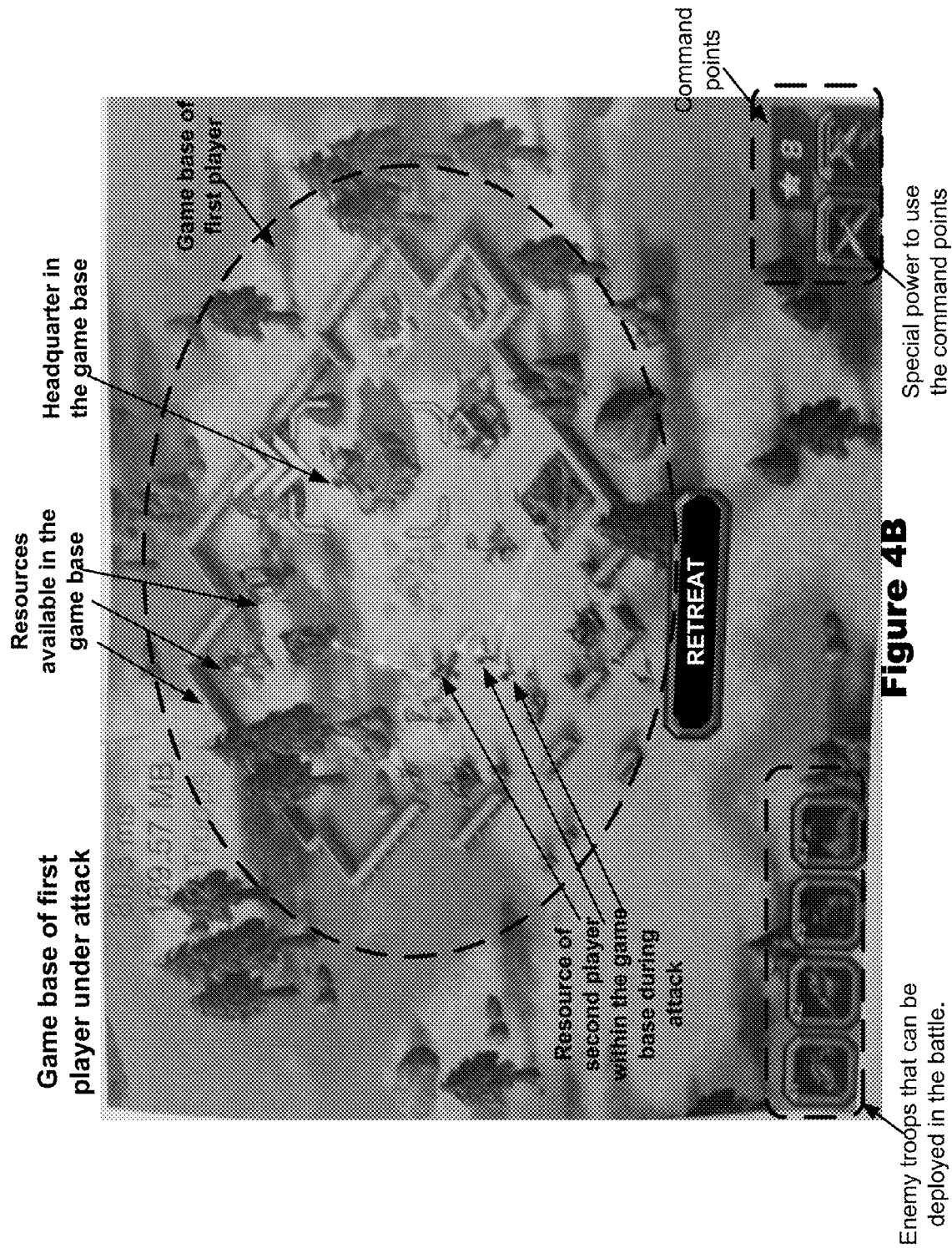

FIG. 4B illustrates an exemplary screen rendition of the progression of the attack during game play as the resources of the second player penetrate the defense line and gain access to the resources at the game base of the first player, in one embodiment. Further, FIG. 4B illustrates the resources that are engaged to defend the game base including wall surrounding the game base, tower within the walls with scout patrol, artillery within some buildings or resources, etc. The progression of the resources of the second player causes loss of resources in the game base and consequently, the defeat of the first player. The defeat of the first player triggers generation of a first social post that includes a link to the portion of the game wherein the game base was under attack, to allow game replay and a request for assistance. The link causes execution of the game replay, in response to user interaction at the link, and allows synchronous interaction with the game.

Figure 4C:
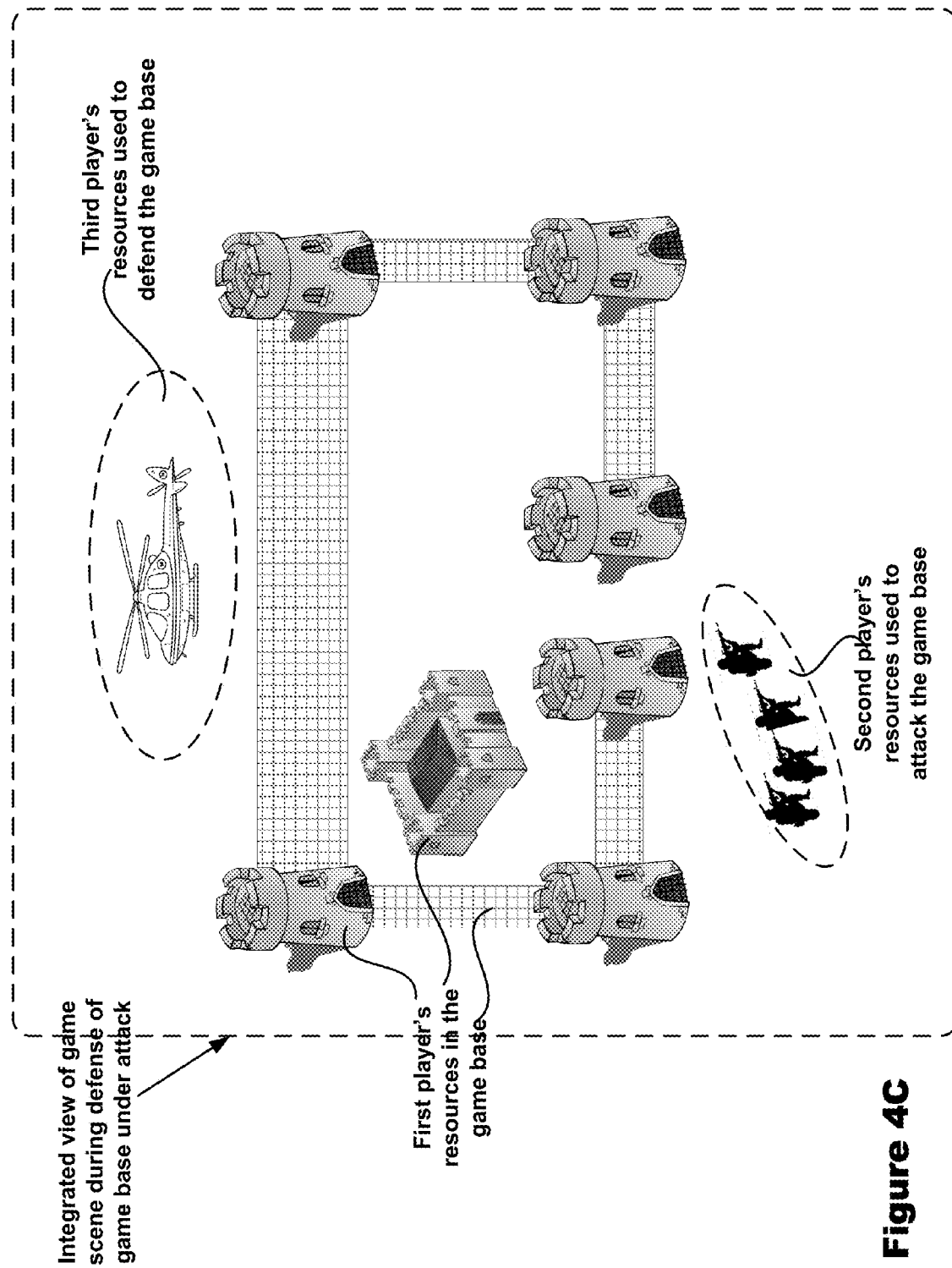
FIG. 4C illustrates an exemplary online screen representation of a defense provided by a third player during the attack on the game base of the first player, in one embodiment of the invention.

FIG. 4C illustrates a game scene that shows an integrated view of the game replay that includes the third player's participation. Accordingly, the integrated view, in this embodiment, includes third player's resources that are used to defend the game base of the first player in response to the third player accepting the request for assistance, the resources of the first player engaged in defending the game base and the resources of the second player used in attacking the game base.

Figure 4D:
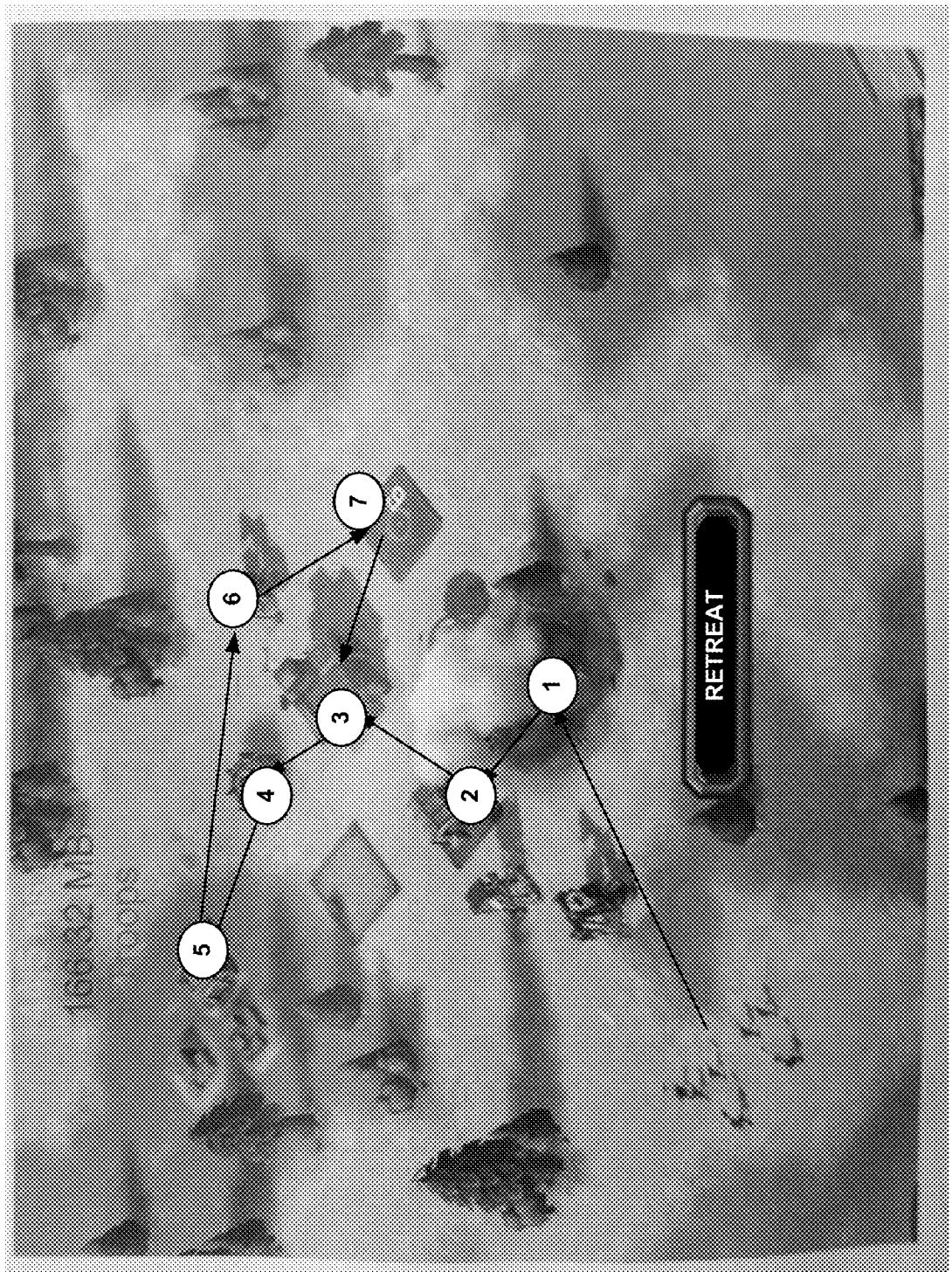
FIG. 4D illustrates an exemplary online screen representation of an offensive path taken by the second player during the attack on a game base of the first player, in accordance to an embodiment of the invention.

FIG. 4D illustrates an exemplary screen rendition of a game scene that identifies the offensive path followed by a resource of the second player that was engaged to attack the game base, in one embodiment. As shown, the ground troop resource of the second player that were engaged in the attack have successfully attacked the building identified by bubble 1, and are set to follow the path identified by bubbles 2, 3, 4, 5, 6 and 7 to attack the buildings/resources in the first player's game base. As they progress in attacking and conquering each of the buildings/resources identified by the various bubbles, the game points/powers/commands of the second player are incremented. In some embodiments, the second player's resource may be re-directed to one or more resources on the game base of the first player that was already visited once during the attack, as illustrated by the arrow from bubble 7 to the resource/building identified by bubble 3. The offensive path of attack of the game play is captured in the recording and when the game replay is initiated in response to the third player responding to the request, the second player's offensive path of attack is replayed and the third player's resources may be deployed to one or more resources in the game base that are along the offensive path to allow the newly deployed third player's resources to aid in defending the first player's resources potentially changing the outcome of the game. For example, based on the third player's launch of a successful defense using his resources, the building/resources that were destroyed in the attack may stop at bubble 2 and the remaining portion of the offensive path may not play out as the resources of the second player may be overcome/defeated by the third player's defensive moves.

Figures 1, 4E:
Figures 2, 4E:
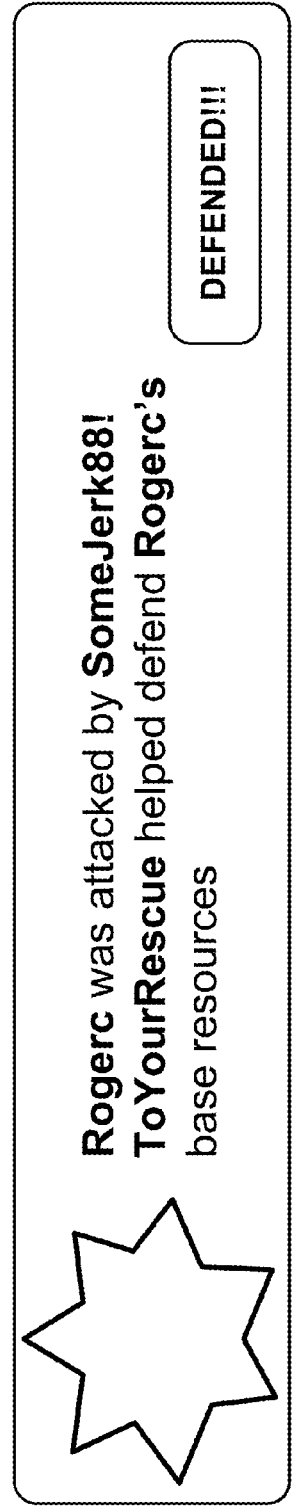

FIGS. 4E-1 and 4E-2 illustrate exemplary first and second social posts that may be provided in a social feed to the one or more social contacts/friends of the first player during game play and game replay. FIG. 4E-1 illustrates a message that may be included in the first social post indicating an attack on the game base of the first player (for e.g., user with online screen name of "RogerC") by the second player (for e.g., user with online screen name of "SomeJerk88") along with a "Defend" call-to-action (CTA) option requesting help to defend the game base of the first player. FIG. 4E-2 illustrates a message that may be included in the second social post informing the social contacts/friends of the first player of an attack on the first player's (user RogerC's) game base by the second player (user SomeJerk88) and of the third player's (for e.g., user with online screen name of "ToYourRescue") assistance in defending the game. Further, the "Defend" option that was provided in the first social post is now updated to "Defended" to indicate that the third player accepted the request and was instrumental in successfully defending the game base of the first player, when the defense was successful in routing the second player. If the third player did not successfully defend the game base, appropriate message or action may be presented, as will be explained below. In one embodiment, the defend option and the defended option are provided as buttons. The button option is exemplary and should not be considered restrictive. As a result, other option indicator to inform the social contacts/friends of the status of the game may also be provided.

In one embodiment, after the third player responds to the request, when the game replay results in the game base not being successfully defended, another first social post may be generated and forwarded to other social contacts of the first player requesting further help in defending the game base. The newly generated first social post, in one embodiment, may be forwarded to all the social contacts of the first player except the third player. In this embodiment, the first social post may include a link to a game replay that has an integrated view of the contributions of the first player and the third player in defending the game base from the attack by the second player. When a second social contact responds to the request, the game replay provided in the link allows the second social contact to interact with the game replay that includes the resources of the first, second and the third player. The combined video recording of this game replay capturing the second social contact's assistance in defending the game base of the first player is forwarded to the social contacts of the first player in a different second social post. The newly generated second social post may be forwarded to all the social contacts of the first player including the first social contact that tried to defend the game base of the first player.

Figure 4F:
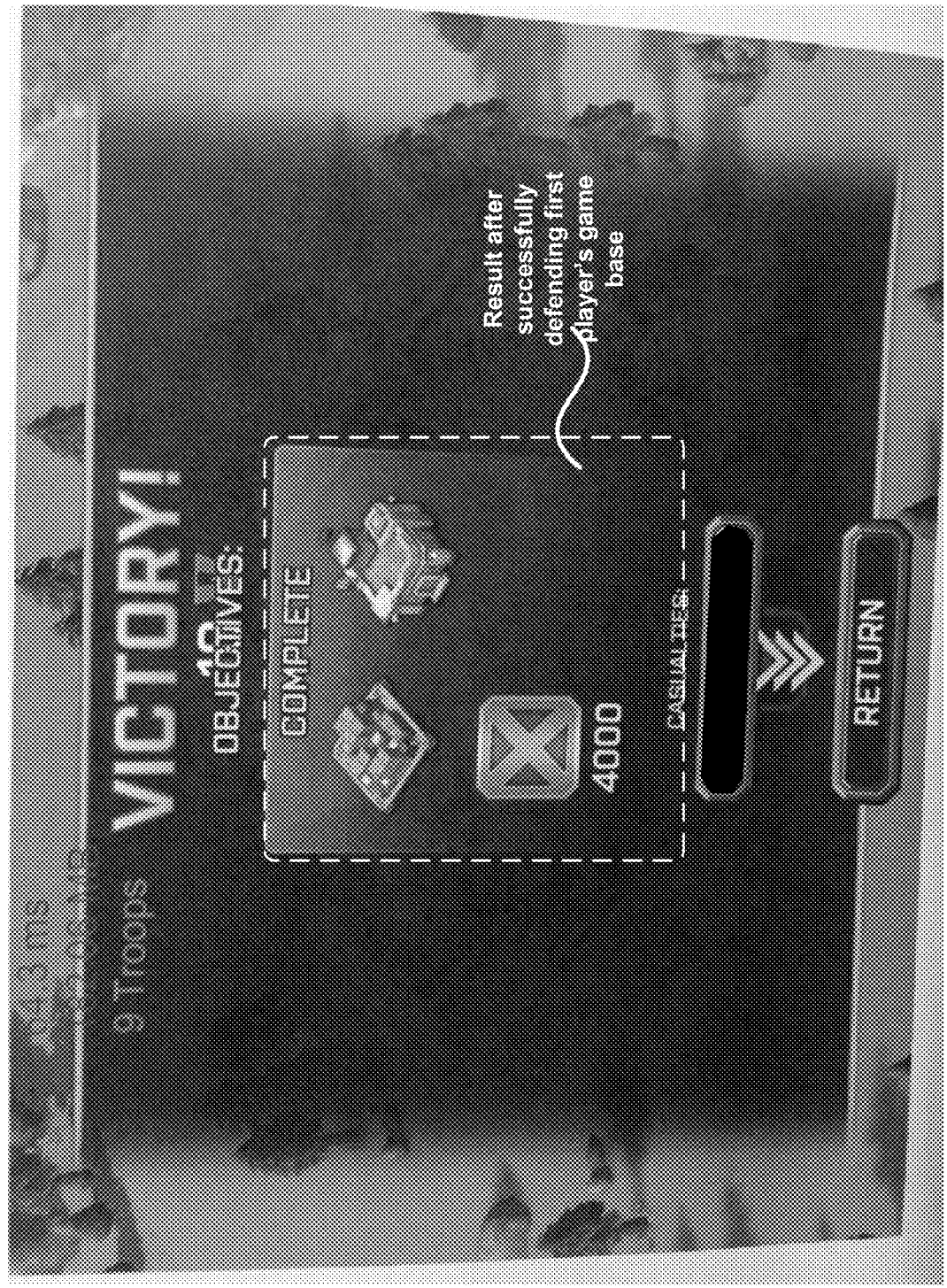
FIG. 4F illustrates an exemplary online screen representation of the result of a successful defense provided by the third player on the game base of the first player, in one embodiment of the invention.

FIG. 4F illustrates an exemplary screen rendition of a game scene after the third player has successfully defended the game base of the first player. The game scene identifies the status of the game play including the amount of resources involved in the attack, type and amount of resources that remain after defending the game base, number of casualties suffered during defense, number of resources won, etc. The game scene also provides the option for the third player to return to his own game base after successfully/unsuccessfully defending the game base of the first player.

Figure 5:
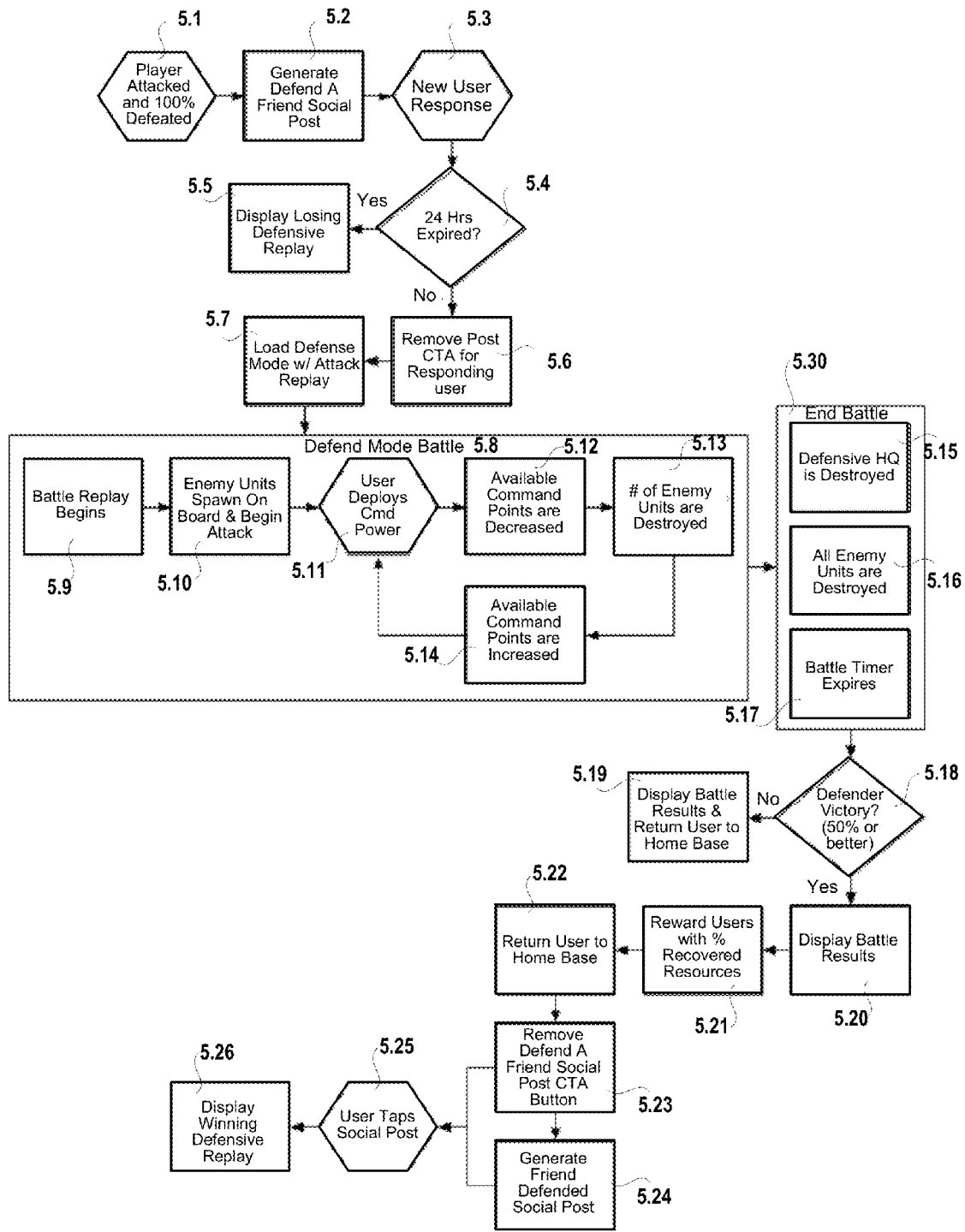
FIG. 5 illustrates an exemplary process flow of game play of the game application that allows a user to change an outcome of a game played between two players, in accordance with an embodiment of the invention.

FIG. 5 illustrates an exemplary data flow diagram of an exemplary game play of a game, in one embodiment. The game play begins with a first player establishing his game base using resources that are provided/available to or unlocked by the first player. During game play, the first player may be attacked by a second player. The second player may attack the game base of the first player to steal the resources or to destroy the resources available therein. When the first player has been defeated, as illustrated in operation 5.1, a first social post is generated, as illustrated in operation 5.2. In one embodiment, the first social post is generated after the first player has been attacked and fully (i.e., 100%) defeated. In an alternate embodiment, the first social post is generated after a pre-defined amount of the resources on the first base have been defeated/destroyed, such as certain amount (for e.g., majority or greater than 50%, etc.) of key/essential resources have been lost or destroyed. The extent or amount of damage that has to be incurred in the game base to trigger the generation of the first social post may be defined in the game rules defined for the game. The first social post is forwarded to one or more social contacts of the first player.

If and when a social contact of the first player responds to the social post, as illustrated in operation 5.3, verification is made to determine if the response from the social contact was received within or outside of a pre-defined threshold response time, as illustrated by decision box operation 5.4. If the response time was outside a pre-defined threshold response time, such as 24 hours, 12 hours, 1 week, etc., as illustrated in the "Yes" branch of decision box 5.4, a video recording of the game involving the unsuccessful defensive moves of the first player in response to the attack initiated by the second player, is rendered on a display screen of a client device associated with the social contact, in response to the social contact responding to the first social post.

If, on the other hand, the social contact responds to the first social post within the response time defined in the pre-defined threshold, as illustrated by the "No" branch of decision box 5.4, the first social post requesting "call-to-action" (CTA) is removed from the social feed of the responding social contact, as illustrated in operation 5.6. Additionally, a portion of the game that includes the attack is loaded for replay along with loading the resources of the first player engaged in defensive mode for defending his game base, as illustrated in operation 5.7. The game replay is initiated with the social contact entering the battle provided in the game replay against the attacking second player in defend mode (5.8).

In the defend mode, the initial battle replay begins, as illustrated in operation 5.9. During the initial battle replay, the code for the portion of the game that includes the attack of the second player (i.e., enemy) on the first player's game base, is executed. The execution of the code causes enemy units to spawn on the game board and the attack begins on the first player's game base, as illustrated in operation 5.10. The enemy units that are spawned are offensive resources of the second player that were engaged during the launching of the initial offense on the game base. The social contact who responds to the social post deploys command powers/defensive resources as part of defending the game base, as illustrated in operation 5.11, and are engaged in the battle to try and defend the game base. Consequent to the deployment of the resources of the social contact, the available command points/resources of the social contact are decreased, as illustrated in operation 5.12.

The resources of the social contact that are engaged in the battle assist in preserving the resources on the game base by actively seeking and destroying enemy units (i.e., resources), as illustrated in operation 5.13. As the social contact seeks and destroys the enemy units, the social contact is awarded command points/powers/resources, etc., in accordance to the type and number of enemy units the social contact's resources destroy. In some embodiments, a portion of the second player's resources that the social contact destroyed are awarded to the third player. The awarded command points, powers, resources are added to the available command points, powers, resources, etc., of the social contact, as illustrated in operation 5.14 and the process returns to operation 5.11 to continue to deploy command power to destroy the enemy units till end of battle is detected, as illustrated in 5.30. The battle is declared to have ended when the head quarter on the game base has been destroyed by enemy units (indicating the defense was unsuccessful), as illustrated in operation 5.15, when all enemy units are destroyed (indicating the defense was successful), as illustrated in operation 5.16, or when a pre-defined battle timer expires, as illustrated in operation 5.17.

In response to detecting end of the battle, the outcome of the battle is evaluated to determine if the social contact was successful in defending the game base, as illustrated in decision box 5.18. In one embodiment, the social contact is considered to have successfully defended the game base when at least 50% of the enemy units have been destroyed or when at least 50% of the resources on the game base have been saved. The successful criteria defined herein (i.e., 50% or better) is exemplary and should not be considered limiting. Other suitable criteria may be employed to determine the success of the defense. Based on the evaluation, when it is determined that the social contact (i.e., defending player or defender) was not successful in defending the game base, as illustrated by the "No" branch of decision box 5.18, the battle results are rendered at the display screen of the client device associated with the social contact and the social contact is returned to the social contact's own game base, as illustrated in operation 5.19. If, however, the social contact was successful in defending the game base, as illustrated by the "Yes" branch of decision box 5.18, the battle results are rendered on the display screen of the social contact, as illustrated in operation 5.20. Additionally, the battle results may be included in the second social post that is forwarded to the first player and the social contacts of the first player. The battle results may include details of game replay, such as number of enemy units destroyed, number of key resources of the first player saved, number of resources of the social contact used in the defense, etc. In one embodiment, the social contact is awarded a percentage of resources that he was instrumental in recovering for the first player, as illustrated in operation 5.21. The awarded resources are added to the social contact's available resources. The social contact is then returned to the social contact's home base.

In addition to rendering the battle results, the successful defense by the social contact results in a combined video recording being generated for the battle that captures the third player's contribution in the game replay defending the game base. The combined video recording provides an integrated view of the battle waged between the attacked first player, attacking second player and the defending third player (i.e., social contact). Consequent to the successful defense provided by the social contact, the "call-to-action" (CTA) request seeking assistance to defend the game base of the first player is removed from the first social post provided to the social contact, as illustrated in operation 5.23.

A second social post is generated identifying the social contact's role in defending the game base of the first player, as illustrated in operation 5.24. The second social post may include a link to the combined video recording that was generated capturing the successful defense of the game base by the social contact. The second social post is shared with the first player and the social contacts of the first player. The second social post includes an interactive indicator with a link to the combined video recording that allows the social contact and/or the first player to interact with. When the social contact (including the one that came to the first player's defense) or the first player interacts with the indicator provided in the second social post, as illustrated in operation 5.25, they are presented with the combined video recording of the winning defensive moves of the social contact, as illustrated in operation 5.26.

The present embodiments thus provide users with an option to participate in a game replay to change the outcome of a game that was played asynchronously between two players. The embodiments provide the users with an opportunity to change the outcome of the game by providing synchronous simulation of the game through a replay of the initial game play and allowing the users to assist a player who was attacked by a second player during the initial game play and using the interactions of the users to change the outcome of the game. The attacking player is allowed to reap the benefits of the attack by awarding points/powers/resources based on the attacking player's successful attack on the game base while the defending player is allowed to defend the game base and reap the benefits resulting from successfully defending the game base of the player under attack, making for a very interesting game play experience for the players. This type of game play that allows the users to reap the benefits of successfully defending the game base encourages other users to socially engage and participate in defending other users as it allows them to enhance their own game playing skills while providing them with an opportunity to increase their game winnings and level within the game.

The various embodiments described herein define a game that allows broadcasting a message through social channels (for e.g., chat and social stream) when a player is attacked in a game and defeated. The broadcast message allows the player's social connections (alliances or friends) to view and interact with the attack replay potentially reducing the attacked player's resource losses. The battle replay allows the player's social connection interact with and alter the outcome of the battle. The battle replay is triggered when the social connection replies to an "Assist to defend" request that is included in the broadcast message in their social feeds/communications. The defensive mode allows the social connection to deploy command powers and help defend against the enemy's attack. Interacting with and altering a replayed attack in defense mode does not affect the attacker's original battle outcome but it helps to improve the social connection's friend's defensive outcome thereby reducing or eliminating game base resource losses.

The command power system is usually used in defensive battle mode. The players have access to the same command powers and command points that they have personally unlocked/upgraded to in person vs. person game play. Additional command points are earned when the social connection successfully defends the game base resource. In some embodiments, command points are earned by the social connection when they destroy attacking enemy's units. In other embodiments, the command points are earned by the social connection when they prevent destruction of a building in the game base. The command points earned and upgraded during the battle increases the social connection's effectiveness in both attacking and defensive roles. In some embodiments, the destructive command powers are directed toward attacking enemy's units and do not affect units or structures of the game base. In some embodiments, some command powers are available in defender mode while the other command powers are available in attack mode. Some command powers may be modified to provide additional functionality and such additional functionality may be used to defend or preserve the structures, units, resources, services, etc., in the game base during game play/game replay. If the defending social connection is able to prevent more than a certain amount or percentage of the total destruction of the original battle (i.e., game play), the defense is considered to be a success. In some embodiments, the social connections that stage successful defenses are rewarded a portion or percentage of the stolen or destroyed resources and the same percentage or portion of the stolen resources is returned to the player that was under attack. Similarly, when a certain portion or percentage of game base (for e.g., 80-100% or any design tuneable value) has been destroyed by an attacker, a "Defend a Friend" request is automatically generated and posted in a first social post to a social connection's social stream/alliance chat, etc.

In some embodiments, the social connections are only allowed one attempt to defend their friend (i.e., player under attack). Once a social connection responds to the request (for e.g., by clicking a "Defend" call-to-action (CTA) button), the request is removed from the original feed post for the engaging social connection. In some embodiments, when the attacked player's game base has been successfully defended by more than a portion or percentage value (for e.g., 50% or any design tuneable value) of the total destruction, the request "Defend" CTA button is replaced with "Defended" text or button or any other indicator. Any social connection or player that clicks on this button or indicator will be shown the winning defensive replay. In some embodiments, if an attack has not been defended successfully within a pre-defined timer period (for e.g., 24 hours, 2 days, 1 week, etc.) from the time the request was generated, the "Defend" CTA button is removed. In such embodiments, only the attack replay is shown to any player/social connection that interacts (for e.g., selects, taps, clicks, etc.) with the broadcast message notification/feed. In some embodiments, when multiple users click an active defense request, the battle with the highest winning percentage defended will be selected for the winning defensive replay. In such embodiments, if two battles tie for highest winning percentage, a social connection with lowest level or shortest time, etc., is selected for inclusion in the winning defensive replay. Upon a successful defense a new message may be generated and posted to the defenders and attacked game base player's social stream/alliance chat. The new message may be shared with additional social connections of the game base player. Social stream and alliance chat are just exemplary mechanisms used for notifying the users/players and that other notification mechanisms/channels may be employed to notify the users/players/social connections. When a social connection or player clicks on the message, the winning defensive replay video that was recorded during game replay is shown at the display screen of their corresponding client device.

Figure 6A:
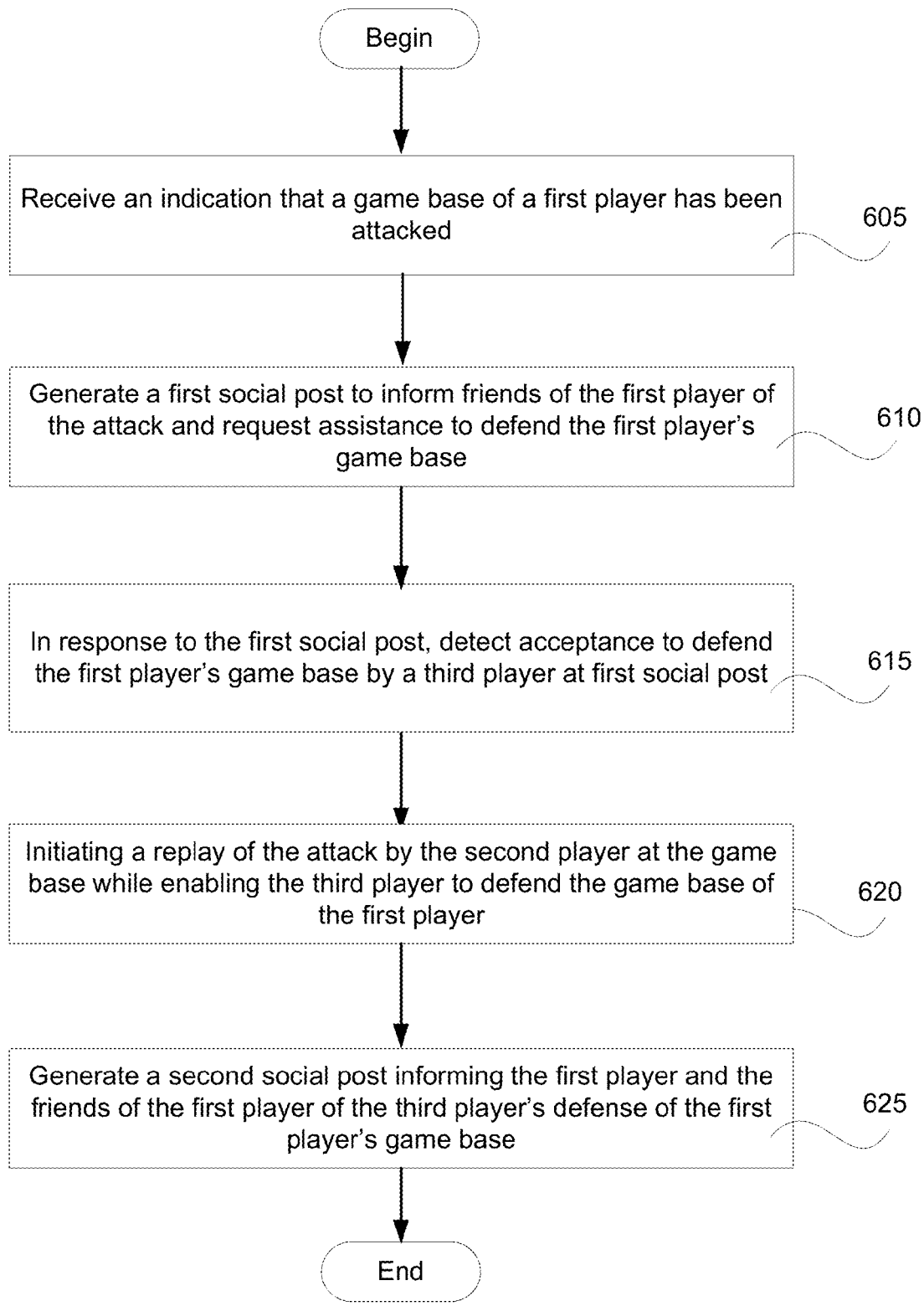
FIGS. 6A and 6B illustrate simplified workflows of operations used to change outcome of a game played between two players, in accordance with different embodiments of the invention.

FIG. 6A illustrates workflow operations of a method that allows a user to assist in changing an outcome of a game that was played asynchronously between two players, in one embodiment of the invention. The method begins at operation 605, when an indication of an attack on a game base of a first player playing a game is received. The game may be an asynchronous defend-and-invade type of a game that allows a player to establish his game base/board and allow the player to go offline after establishing the game base. The game includes logic that allows the resources provided in the game base to defend the game base during an attack while the player is offline. A second player playing the same game may attack the game base to conquer the game base and steal the resources within the game base to strengthen his game base and his overall position in the game.

The game code detects the attack by the second player and, in response, may generate a first social post to inform other players of the attack and request assistance in defending the game base, as illustrated in operation 610. The first social post may include a request seeking assistance in defending the first player's game base and game code for a portion of the game that includes the attack, for game replay. The first social post is forwarded in a social feed, an email, a chat message, etc., to one or more social contacts of the first player identified from one or more social networks, one or more game networks, etc. In one embodiment, the request is forwarded to the social contacts and the first player is not made aware of the attack. When a social contact (i.e., third player) interacts with the request and accepts the request to defend the first player's game base, as illustrated in operation 615, a replay of the portion of the game that includes the attack is initiated and the social contact is enabled to synchronously interact with the game replay, as illustrated in operation 620.

User interaction from the third player is detected during game replay and is used to affect an outcome of the game. The interaction of the third player may result in the third player successfully defending the game base or be defeated by the second player. For example, the interaction may result in the third player destroying substantial amount of the resources of the second player used in the attack. Alternately, the second player's resources may destroy the third player's resources used in defending the game base. Based on how the game is played out, the corresponding player's game points, powers, commands, resources are adjusted upward or downward to reflect the current status.

When the third player successfully defends the game base, a second social post is generated, as illustrated in operation 625. The second social post includes a message informing the first player and the social contacts of the first player of the third player's successful defense of the first player's game base.

Figure 6B:
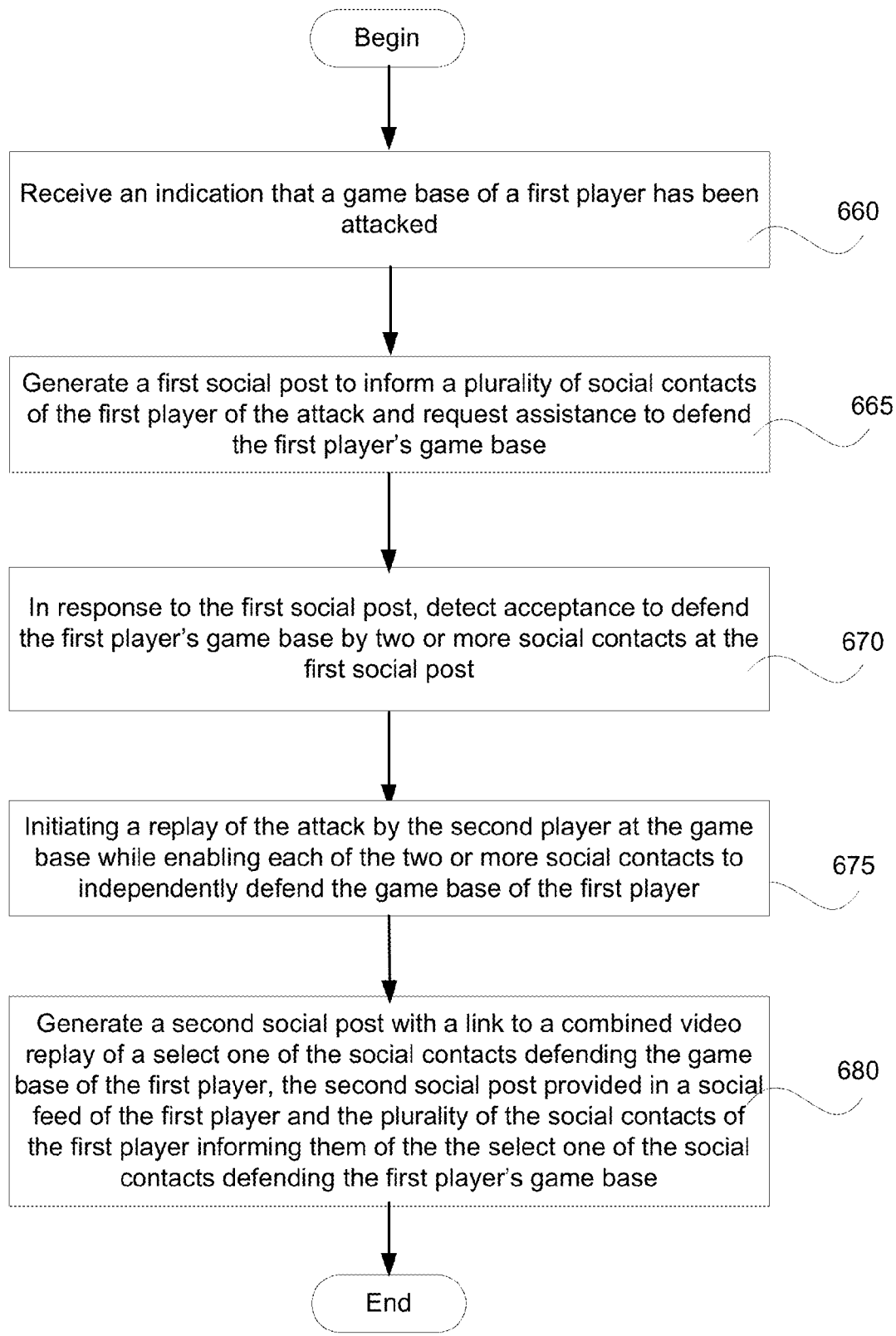

FIG. 6B illustrates workflow operations of a method that allows a user to assist in changing an outcome of a game played asynchronously between two players, in another embodiment of the invention. The method begins at operation 660, when an indication is received of an attack on a game base of a first player playing a game. The game may be an asynchronous defend-and-invade type of an online interactive game. The game allows a player to establish his game base/board and after the setting-up of the game base, allow the first player to go offline and the game logic allows the resources of the game to self-defend the game base. A second player playing the same game may attack the game base to conquer the game base and steal the resources within the game base to strengthen his game base and his position in the game.

The game code detects the attack by the second player and, in response, may generate a first social post to inform a plurality of social contacts of the first player of the attack and request assistance in defending the game base, as illustrated in operation 665. The first social post may include a request seeking assistance in defending the first player's game base and game code for a portion of the game that includes the attack, to enable game replay. The first social post is forwarded in a social feed, an email, a chat message, or any other communication mode, to one or more social contacts of the first player identified from one or more social networks of the first player, one or more game networks, etc. In one embodiment, the request is forwarded to the social contacts of the first player and not to the first player. When two or more social contacts interact with the request and accept the request to defend the first player's game base, as illustrated in operation 670, a replay of the portion of the game that includes the attack is initiated for each of the social contacts that responded to the request and allow each of the social contact to independently interact with the game replay in a synchronous mode, as illustrated in operation 675.

User interaction from the third player is detected during game replay and is used to affect an outcome of the game. The interaction of the social contacts may result in the respective social contacts successfully defending the game base or be defeated by the second player. Based on how the game is played out, the corresponding player's game points, powers, commands, resources are adjusted upward or downward to reflect the current status.

When two or more social contacts successfully defend the game base, a second social post is generated, as illustrated in operation 680. The second social post includes a link to a combined video recording of the attack and defense for the attack provided by a selected one of the two or more social contacts that successfully defended the game base and a message informing the first player and the social contacts of the first player informing them of the successful defense of the first player's game base. The combined video recording includes the first player's game base being defended from the attack by the second player and the select social contact's contribution in assisting in the defense of the game base. The second social post is forwarded to the first player and to the social contacts of the first player informing the social contacts of the attack and the selected social contact's contribution in defending the game base. When any one of the social contacts or the first player interact with the second social post, the combined video recording of the game replay for the portion of the game is presented at the display screen of the respective client devices. The combined video recording may also present the current status of the game resources of each of the players involved in the game replay as well as the identity of the first player, the second player, and/or the social contact that helped to successfully defend the game base of the first player.

Figure 7:
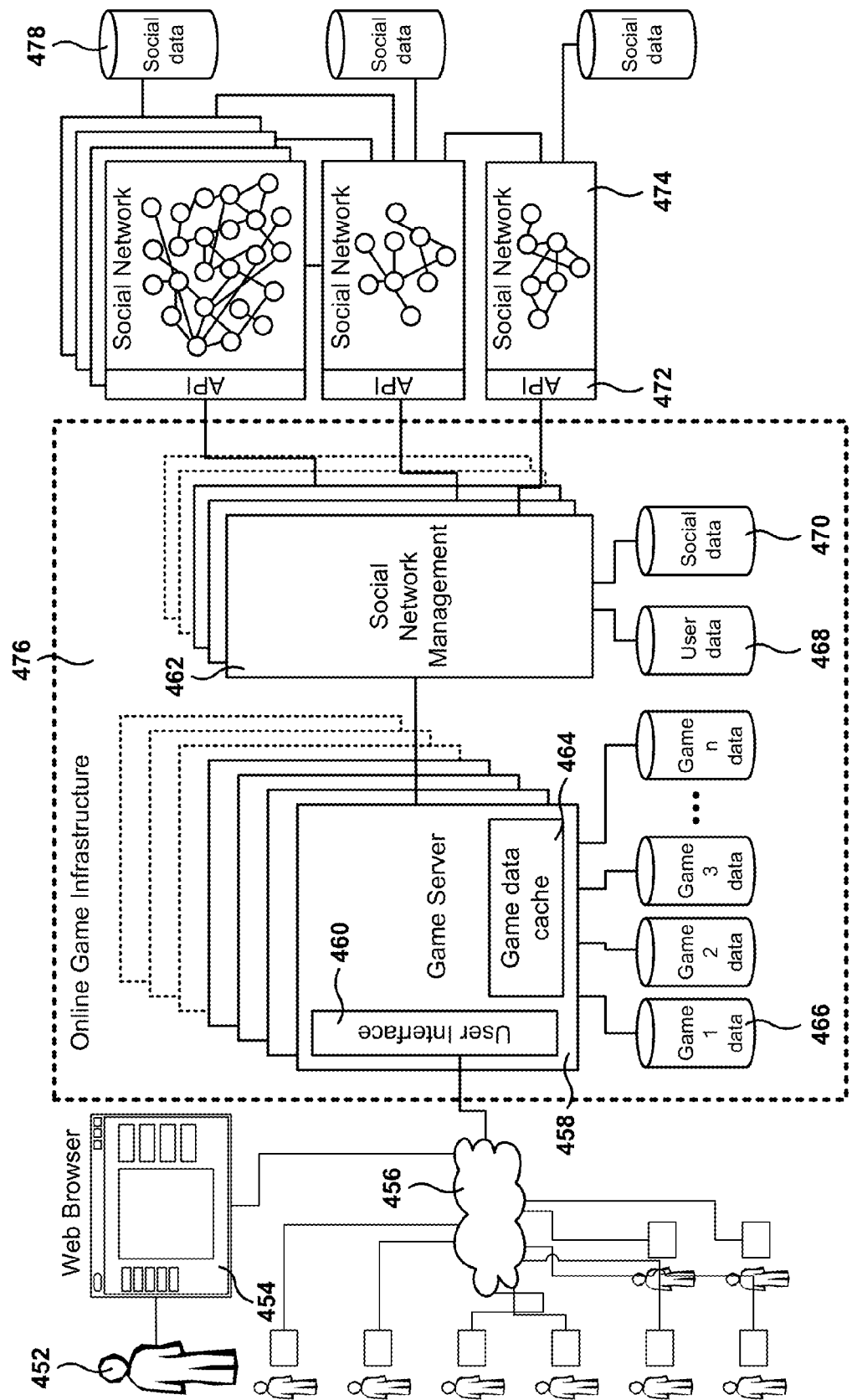
FIG. 7 illustrates an implementation of a Massively Multiplayer Online (MMO) infrastructure in which the video game may be played amongst a plurality of users, according to one embodiment.

FIG. 7 illustrates an implementation of an online game infrastructure, according to one embodiment. The online game infrastructure 476 includes one or more game servers 458, web servers (not shown), one or more social network management servers 462, and databases to store game related information. In one embodiment, game server 458 provides a user interface 460 for players 452 to play the online game. In one embodiment, game server 458 includes a Web server for players 452 to access the game via web browser 454, but the Web server may also be hosted in a server different from game server 458. Network 456 interconnects players 452 with the one or more game servers 458.

Each game server 458 has access to one or more game databases 466 for keeping game data. In addition, a single database can store game data for one or more online games. Each game server 458 may also include one or more levels of caching. Game data cache 464 is a game data cache for the game data stored in game databases 466. For increased performance, caching may be performed in several levels of caching. For instance, data more frequently used is stored in a high priority cache, while data requiring less access during a session will be cached and updated less frequently.

The number of game servers 458 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 462 provide support for the social features incorporated into the online games. The social network management servers 462 access social data 478 from one or more social networks 474 via Application Programming Interfaces (API) 472 made available by the social network providers. Each social network 474 includes social data 478, and this social data 478, or a fraction of the social data, is made available via API 472. As in the case of the game servers, the number of social network management servers 462 that are active at a point in time changes according to the load on the infrastructure. As the demand for social data increases, the number of social network management servers 462 increases. Social network management servers 462 cache user data in database 468, and social data in database 470. The social data may include the social networks where a player is present, the social relationships for the player, the frequency of interaction of the player with the social network and with other players, etc. Additionally, the user data kept in database 468 may include the player's name, demographics, e-mail, games played, frequency of access to the game infrastructure, etc.

It is noted that the embodiment illustrated in FIG. 7 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 7 should therefore not be interpreted to be exclusive or limiting, but rather exemplary or illustrative.

Figure 8:
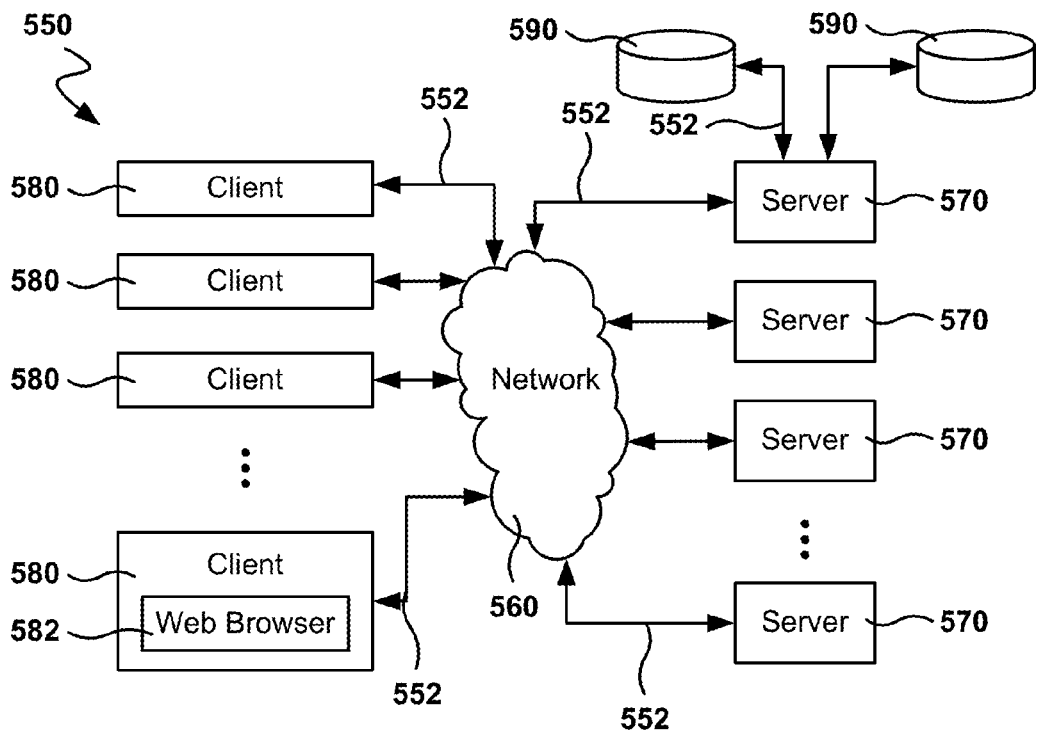
FIG. 8 illustrates an example network environment suitable for implementing embodiments.

FIG. 8 illustrates an example network environment 550 suitable for implementing embodiments. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wired, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, community server, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HyperText Markup Language (HTML) files or other file types, or may dynamically create or constitute files upon a request, and communicate them to clients 580 in response to Hypertext Transfer Protocol (HTTP) or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more servers 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a notebook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582 (for e.g., Microsoft Internet Explorer, Google Chrome, Or Mozilla Firefox, etc.) and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in Javascript, Java, Microsoft Silverlight, combinations of markup language and scripts such as AJAX (Asynchronous Javascript and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 9:
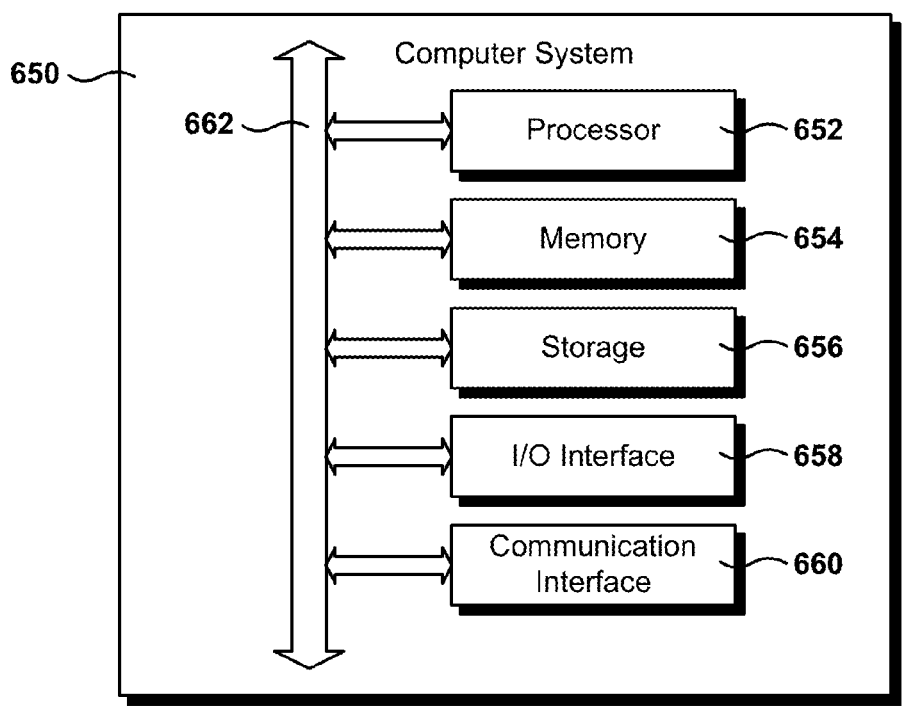
FIG. 9 illustrates an example computer system for implementing embodiments.

FIG. 9 illustrates an example computer system 650 for implementing embodiments. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include a Hard Disk Drive (HDD), a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnects.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend. The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention.

What is claimed is:

1. A method, comprising:
    detecting establishment of a game base of a game by a first player, the game base established using resources selected by the first player for the game;
    monitoring interactions at the game base to determine if a second player approaching the game base is attempting an attack on the game base of the first player;
    requesting assistance to defend the game base of the first player, upon detecting the attempted attack on the game base by the second player, the assistance being requested from social contacts of the first player;
    receiving a response from a social contact of the first player who has responded to the request for assistance;
    generating, for the social contact, a replay of a portion of a game play of the game that includes an attack on the game base by the second player, to provide the social contact with context regarding the game play that led up to the attack; and
    enabling the social contact to defend the game base from the attack and produce an outcome for the game play which includes actions taken to defend the attack.

2. The method of claim 1, further includes generating a video recording of the replay that includes actions associated with the attack of the game base by the second player, interactions from one or more resources of the first player engaged in defending the game base, and the actions of the social contact that actively defended the game base to produce the outcome of the game, the video recording of the replay shared with the first player and with one or more of the social contacts of the first player.

3. The method of claim 1, further includes awarding the social contact a portion of resources of the game saved by the actions taken by the social contact at the game base of the first player, the portion of the resources used to strengthen the game base of the social contact.

4. The method of claim 1, wherein the request for assistance is generated upon determining the resources of the first player are unsuccessful in defending the game base from the attack.

5. The method of claim 1, wherein one or more of the resources selected by the first player are enabled with artificial intelligence to provide status of the resources deployed in the game base during the attack.

6. The method of claim 1, wherein monitoring interactions further includes determining if actions provided by the second player at the game base of the first player are of an offensive mode or a non-offensive mode, wherein the offensive mode is indicative of the attack on the game base.

7. The method of claim 1, wherein the request for assistance is provided in one of a social post in a social feed of a social network, an email post, a text message to a mobile device associated with each of the one or more social contacts, a message on a message feed, or any two or more combinations thereof.

8. The method of claim 7, wherein the post includes a link to a recording of the game play of the portion of the game that includes the attack and an executable game code for game replay of the portion of the game.

9. The method of claim 1, wherein actions of the second player leading to the attack of the game base, is asynchronous and wherein the actions of the social contact to defend the attack during the replay of the game is synchronous.

10. The method of claim 1, wherein the social contact is a player with an established game base for the game, and wherein upon completion of the replay, returning the social contact to the established game base of the social contact, the returning to the game base includes updating a game state and game resources of the game of the social contact based on the outcome of the game from the replay.

11. The method of claim 1, further includes receiving responses from other social contacts of the first player who have responded to the request for assistance, and generating replay of the portion of the game play of the game that includes the attack on the game base by the second player, to provide each of the other social contacts with context regarding the game play that led up to the attack, the replay enabling each of the other social contacts to defend the game base from the attack and produce a corresponding outcome for the game play.

12. The method of claim 11, further includes recording the replay of each of the social contacts defending the game base from the attack, the recordings of the social contacts provided to the first player to enable the first player to select one of the recordings for sharing with the social contacts of the first player.

13. A computer program embedded in a non-transitory computer-readable storage medium, which when executed by one or more processors performs a method for altering game play outcomes of a game, the computer program comprising:

program instructions for detecting establishment of a game base of a game by a first player, the game base established using resources selected by the first player for the game;

program instructions for monitoring interactions at the game base to determine if a second player approaching the game base is attempting an attack on the game base of the first player;

program instructions for requesting assistance to defend the game base of the first player, upon detecting the attempted attack on the game base by the second player, the assistance being requested from social contacts of the first player;

program instructions for receiving a response from a social contact of the first player who has responded to the request for assistance;

program instructions for generating, for the social contact, a replay of a portion of a game play of the game that includes an attack on the game base by the second player, to provide the social contact with context regarding the game play that led up to the attack; and program instructions for enabling the social contact to defend the game base from the attack and produce an outcome for the game play which includes actions taken to defend the attack.

14. The computer program of claim 13, further includes program instructions for generating a video recording of the replay that includes game scenes provided by the game, actions associated with the attack of the game base by the second player, interactions from one or more resources of the first player engaged in defending the game base, and the actions of the social contact that actively defended the game base to produce the outcome of the game, the video recording of the replay shared with the first player and with one or more of the social contacts of the first player.

15. The computer program of claim 13, further includes program instructions for awarding the social contact a portion of resources of the game saved by the actions taken by the social contact at the game base of the first player, the portion of the resources used to strengthen the game base of the social contact.

\* \* \* \* \*